(12) United States Patent
Guo

(10) Patent No.: US 12,520,021 B2
(45) Date of Patent: Jan. 6, 2026

(54) POSITIONING MEMBER AND ELECTRONIC DEVICE

(71) Applicant: HONOR DEVICE CO., LTD., Shenzhen (CN)

(72) Inventor: Renwei Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 203 days.

(21) Appl. No.: 18/569,315

(22) PCT Filed: Apr. 12, 2023

(86) PCT No.: PCT/CN2023/087922
§ 371 (c)(1),
(2) Date: Dec. 12, 2023

(87) PCT Pub. No.: WO2024/007661
PCT Pub. Date: Jan. 11, 2024

(65) Prior Publication Data
US 2024/0276082 A1      Aug. 15, 2024

(30) Foreign Application Priority Data

Jul. 8, 2022  (CN) .......................... 202210802136.9

(51) Int. Cl.
*H04N 23/51* (2023.01)
*H04M 1/02* (2006.01)
(Continued)

(52) U.S. Cl.
CPC .......... *H04N 23/51* (2023.01); *H04M 1/0264* (2013.01); *H04N 23/54* (2023.01); *H04N 23/57* (2023.01)

(58) Field of Classification Search
CPC ........ H04N 23/51; H04N 23/54; H04N 23/57; H04N 23/50; H04M 1/0264; H04M 1/0283
See application file for complete search history.

(56) References Cited

U.S. PATENT DOCUMENTS 8,152,127 B2 *   4/2012   Chang .................... G06F 1/182
                                                  248/560
10,996,713 B2 *  5/2021   Pakula .................... H04N 23/51
(Continued)

FOREIGN PATENT DOCUMENTS

CN          2031931 U       2/1989
CN          101275442 A    10/2008
(Continued)

OTHER PUBLICATIONS

Miao Jian-yu; "Design, manufacturing and assembly for optical lens of mapping camera"; Optics and Precision Engineering; Sep. 15, 2008; 6pages.

*Primary Examiner* — Mekonnen D Dagnew
(74) *Attorney, Agent, or Firm* — WOMBLE BOND DICKINSON (US) LLP

(57) ABSTRACT

This application provides a positioning member and an electronic device. The electronic device includes a housing, a bracket, a camera, and a first positioning member. The bracket includes a first side surface. The camera includes a camera body, the camera body is located on a side that the first side surface faces, and a light-incident surface of the camera body is opposite to the light-transmitting window. The first positioning member is located between the first side surface and the camera body, the first positioning member includes a first positioning member body, and the first positioning member body is disposed on the first side surface. The first positioning member body includes a first end and a second end. A compressible capability of the first (Continued)

positioning member body gradually increases from the first end to the second end in a direction perpendicular to the first side surface.

18 Claims, 20 Drawing Sheets

(51) Int. Cl.
  *H04N 23/54* (2023.01)
  *H04N 23/57* (2023.01)

(56) References Cited

U.S. PATENT DOCUMENTS

| | | | |
|---|---|---|---|
| 11,252,310 | B2 | 2/2022 | Zhang et al. |
| 2018/0176426 | A1* | 6/2018 | Wei ................. A61B 3/154 |
| 2020/0218082 | A1 | 7/2020 | Choi et al. |
| 2021/0149145 | A1 | 5/2021 | Fang et al. |
| 2021/0227112 | A1 | 7/2021 | Guo et al. |

FOREIGN PATENT DOCUMENTS

| | | |
|---|---|---|
| CN | 204946689 U | 1/2016 |
| CN | 106161902 A | 11/2016 |
| CN | 111432098 A | 7/2020 |
| CN | 112492147 A | 3/2021 |
| CN | 112911112 A | 6/2021 |
| CN | 213358304 U | 6/2021 |
| CN | 213367912 U | 6/2021 |
| CN | 213661669 U | 7/2021 |
| CN | 113395432 A | 9/2021 |
| CN | 215300747 U | 12/2021 |
| CN | 114025525 A | 2/2022 |
| CN | 114615414 A | 6/2022 |
| CN | 114885055 A | 8/2022 |
| EP | 3780564 A1 | 2/2021 |
| JP | 2012027331 A | 2/2012 |
| JP | 2021110657 A | 8/2021 |
| WO | 2019206255 A1 | 10/2019 |
| WO | 2019237269 A1 | 12/2019 |
| WO | 2022012246 A1 | 1/2022 |

* cited by examiner

POSITIONING MEMBER AND ELECTRONIC DEVICE

CROSS-REFERENCE TO RELATED APPLICATIONS

This application is a National Stage of International Application No. PCT/CN2023/087922, filed on Apr. 12, 2023, which claims priority to Chinese Patent Application No. 202210802136.9, filed on Jul. 8, 2022, both of which are hereby incorporated by reference in their entireties.

TECHNICAL FIELD

This application relates to the field of electronic product technologies, and in particular, to a positioning member and an electronic device including the positioning member.

BACKGROUND

With development of technologies, electronic devices such as a mobile phone and a tablet computer each usually include a built-in camera. In addition, a light-transmitting window is disposed on a housing of the electronic device, and a light-incident surface of a camera is opposite to the light-transmitting window, so that external scene light can enter the camera through the light-transmitting window, thereby implementing external video or image shooting of the electronic device.

In the electronic device, it is usually required to ensure that a center of the light-incident surface of the camera is approximately opposite to a center of the light-transmitting window, to ensure appearance fineness of the electronic device. However, due to poor stability of a circumferential limiting structure of the camera, the center of the light-incident surface of the camera is prone to being deviated from the center of the light-transmitting window. Consequently, an eccentric case occurs, and the appearance fineness of the electronic device is low.

SUMMARY

Embodiments of this application provide a positioning member and an electronic device, so as to resolve a problem of how to reduce an eccentric amount of a camera relative to a light-transmitting window, to improve appearance fineness of the electronic device.

To achieve the foregoing objective, the following technical solutions are used in the embodiments of this application:

According to a first aspect, an electronic device is provided. The electronic device includes a housing, a bracket, a camera, and a first positioning member. The housing has a first wall plate, and the first wall plate includes a light-transmitting window. The bracket is disposed in the housing, a surface that is of the bracket and that faces the first wall plate is a first surface, and a surface that is of the bracket and that faces away from the first wall plate is a second surface. The bracket further includes a first side surface, and the first side surface is connected between the first surface and the second surface. The camera is disposed in the housing, the camera includes a camera body, the camera body is located on a side that the first side surface faces, and a light-incident surface of the camera body faces the light-transmitting window. The first positioning member is located between the first side surface and the camera body, and the first positioning member includes a first positioning member body.

The first positioning member body is disposed on the first side surface. An end that is of the first positioning member body and that faces the first wall plate is defined as a first end, and an end that is of the first positioning member body and that faces away from the first wall plate is defined as a second end. Based on this definition, a compressible capability of the first positioning member body gradually increases from the first end to the second end in a direction perpendicular to the first side surface.

In this way, when a position of the camera body deviates toward a direction close to the first side surface, the camera body squeezes the first positioning member, so that the first positioning member is compressed in the direction perpendicular to the first side surface. In addition, because the compressible capability of the first positioning member body in the first positioning member gradually increases from the first end to the second end, a contact surface between the first positioning member and the camera body tilts toward the direction close to the first side surface from the first end to the second end. Then, the camera body also tilts in a limited gap in the electronic device. In a tilt process, a light-incident end of the camera body moves a specific distance toward a direction away from the first side surface. The distance can be used to compensate for, to some extent, an eccentric amount that is between a center of the light-incident surface of the camera body and a center of the light-transmitting window on the first wall plate and that is generated by compressing the first positioning member, thereby improving appearance fineness of the electronic device. The light-incident end of the camera body is an end part of an end in which the light-incident surface of the camera body is located. In addition, when the position of the camera body deviates toward the direction close to the first side surface, the contact surface between the first positioning member and the camera body tilts toward the direction close to the first side surface from the first end to the second end, and the first positioning member can apply, to the camera body, a tilted rebound force pointing away from the first wall plate, where the rebound force can be used to prevent the camera body from moving toward a direction close to the first wall plate. On the other hand, after a structure of the first positioning member is determined, when the position of the camera body deviates toward the direction close to the first side surface, a direction of the rebound force applied by the first positioning member to the camera body is determined, so that the camera body tilts toward the determined direction. In this way, a position of the light-transmitting window on the first wall plate can be designed, so that the center of the light-transmitting window is aligned with the center of the light-incident surface of the camera body when the camera body is tightly pressed on the first positioning member. In a product batch production process, if the camera body squeezes the first positioning member, the direction of the rebound force applied by the first positioning member to the camera body is determined. Therefore, a posture of the camera body relative to the light-transmitting window can be macroscopically controlled, thereby helping increase a product yield.

In a possible implementation of the first aspect, the first positioning member body includes: a first sidewall and a second sidewall that are disposed opposite to and spaced from each other, and a third sidewall and a fourth sidewall that are disposed opposite to and spaced from each other. The first sidewall is located between the first side surface and the second sidewall. The second sidewall is located between the first sidewall and the camera body. The third sidewall is connected between the first sidewall and the second sidewall, and the third sidewall forms the first end. The fourth sidewall is connected between the first sidewall and the second sidewall, and the fourth sidewall forms the second end. The first sidewall, the second sidewall, the third sidewall, and the fourth sidewall enclose an accommodating space, and at least the third sidewall and the fourth sidewall each include an elastic-plastic material. In this way, the first positioning member body includes a housing structure formed by the first sidewall, the second sidewall, the third sidewall, and the fourth sidewall. The third sidewall and the fourth sidewall of the housing structure each include the elastic-plastic material. Therefore, bending deformation can be generated, so that when the housing structure is squeezed by the camera body, compression deformation can be generated in the direction perpendicular to the first side surface. This structure is simple with fewer materials. Therefore, costs are low.

In a possible implementation of the first aspect, the first sidewall, the second sidewall, the third sidewall, and the fourth sidewall are integrally formed. In this way, forming difficulty and composition structure complexity of the first positioning member body can be reduced.

In a possible implementation of the first aspect, a thickness of the third sidewall is greater than a thickness of the fourth sidewall. In this way, on a premise that the materials of the third sidewall and the fourth sidewall are the same, the fourth sidewall is more elastic and is more easily bent compared with the third sidewall, so that the compressible capability of the first positioning member body gradually increases from the first end to the second end in the direction perpendicular to the first side surface. This structure is simple and easy to implement.

In a possible implementation of the first aspect, a wall thickness of the second sidewall gradually decreases in a direction pointing from the third sidewall to the fourth sidewall; and/or a wall thickness of the first sidewall gradually decreases in a direction pointing from the third sidewall to the fourth sidewall. In this way, a width of the accommodating space also gradually increases in the direction pointing from the third sidewall to the fourth sidewall, so that the compressible capability of the first positioning member body gradually increases from the first end to the second end in the direction perpendicular to the first side surface. This structure is simple and easy to implement.

In a possible implementation of the first aspect, the wall thickness of the second sidewall decreases continuously or stepwise in the direction pointing from the third sidewall to the fourth sidewall; and/or the wall thickness of the first sidewall decreases continuously or stepwise in the direction pointing from the third sidewall to the fourth sidewall.

In a possible implementation of the first aspect, an elastic modulus of the material of the third sidewall is greater than an elastic modulus of the material of the fourth sidewall. In this way, on a premise that the thickness of the third sidewall is equal to the thickness of the fourth sidewall, the fourth sidewall is more elastic and is more easily bent compared with the third sidewall, so that the compressible capability of the first positioning member body gradually increases from the first end to the second end in the direction perpendicular to the first side surface. This structure is simple and easy to implement.

In a possible implementation of the first aspect, the accommodating space is filled with a soft elastic material, and an elastic modulus of the soft elastic material is less than an elastic modulus of the material of each of the third sidewall and the fourth sidewall. The soft elastic material includes but is not limited to silicone, rubber, foam, and sponge. In this way, structural stability of the first positioning member body can be improved, and interference with a layout form for a size of the compressible capability of the first positioning member body can be avoided.

In a possible implementation of the first aspect, the first positioning member body includes: a first sidewall and a second sidewall that are disposed opposite to and spaced from each other, and a third sidewall connected between the first sidewall and the second sidewall. The first sidewall is located between the first sidewall and the second sidewall. The second sidewall is located between the first side surface and the camera body. The third sidewall forms the first end, and at least the third sidewall includes an elastic-plastic material. The first sidewall, the second sidewall, and the third sidewall enclose an accommodating space, an opening is formed at an end that is of the accommodating space and that is away from the third sidewall, and parts that are of the first sidewall and the second sidewall and that enclose the opening form the second end. In this way, a compressible capability of the second end is larger compared with the first end, so that the compressible capability of the first positioning member body gradually increases from the first end to the second end in the direction perpendicular to the first side surface. This structure is simple with fewer materials. Therefore, costs are low.

In a possible implementation of the first aspect, the first positioning member body includes a plurality of elastic material layers successively stacked from the first end to the second end. "A plurality of layers" represents two or more layers. For example, there are four elastic material layers, which are respectively a first elastic material layer, a second elastic material layer, a third elastic material layer, and a fourth elastic material layer. Based on this, the plurality of elastic material layers are arranged in descending order of elastic moduli. To be specific, the elastic modulus of the second elastic material layer is less than the elastic modulus of the first elastic material layer, the elastic modulus of the third elastic material layer is less than the elastic modulus of the second elastic material layer, and the elastic modulus of the fourth elastic material layer is less than the elastic modulus of the third elastic material layer. A larger elastic modulus indicates larger rigidity, and a smaller elastic modulus indicates larger elasticity. In this way, the compressible capability of the first positioning member body gradually increases from the first end to the second end in the direction perpendicular to the first side surface. This structure is simple and easy to be manufactured.

In a possible implementation of the first aspect, a surface that is of the first positioning member body and that faces the first side surface is a fastening surface, the fastening surface is a plane, and the fastening surface is disposed on the first side surface. A surface that is of the first positioning member body and that faces away from the first side surface is a support surface, and the support surface faces the camera body. The first positioning member body is in a free state, and the support surface is a plane parallel to the fastening surface and opposite to the fastening surface; or the first positioning member body is in a compressed state due to being squeezed by the camera body, and the support surface is a tilted surface that tilts close to the fastening surface in a direction pointing from the first end to the second end. In this way, when the first positioning member body is in the free state, the first positioning member body has a regular shape, thereby facilitating positioning. In some other embodiments, when the first positioning member body is in the free state, the support surface may alternatively tilt at a specific angle relative to the fastening surface, or the support surface is a curved surface, for example, an arc surface.

In a possible implementation of the first aspect, the first positioning member further includes a first contact member, and the first contact member is disposed on the support surface. The first contact member is not limited by a material of the first positioning member body, and may be made of a suitable material based on a requirement, to ensure support performance for the camera body.

In a possible implementation of the first aspect, the electronic device further includes a circuit board, where the circuit board is disposed in the housing, and the circuit board is located on a side that is of the bracket and that is away from the first wall plate. The camera further includes an electrical connection terminal and a flexible electrical connection structure. The electrical connection terminal is located on a side that is of the camera body and that faces away from the first positioning member, and the electrical connection terminal is fixedly and electrically connected to the circuit board. The flexible electrical connection structure is connected between the camera body and the electrical connection terminal, and the flexible electrical connection structure is in a bent state, to apply, to the camera body, an elastic force pointing to the first positioning member. The elastic force may be a resultant force applied to the camera body by the flexible electrical connection structure, or may be one of component forces of the resultant force. In this way, the camera body is clamped and fastened by using the first positioning member and the flexible electrical connection structure, so that the camera body is fastened at a position in a plane parallel to the first wall plate. In this positioning manner, a positioning structure does not need to be added. Therefore, the electronic device has a simple composition structure, low costs, and high assembly efficiency.

In a possible implementation of the first aspect, the bracket further includes a second side surface, the second side surface is connected between the first surface and the second surface, and the second side surface is connected to the first side surface. The camera body is further located on a side that the second side surface faces. The electronic device further includes a second positioning member. The second positioning member is located between the second side surface and the camera body, and the second positioning member includes a second positioning member body. The second positioning member body is disposed on the second side surface. An end that is of the second positioning member body and that faces the first wall plate is defined as a third end, and an end that is of the second positioning member body and that faces away from the first wall plate is defined as a fourth end. Based on this definition, a compressible capability of the second positioning member body gradually increases from the third end to the fourth end in a direction perpendicular to the second side surface. A specific structural form of the second positioning member body may be the same as the structural form of the foregoing first positioning member body. In this way, the camera body is limited on still another side in the plane parallel to the first wall plate by using the second side surface of the bracket. This can improve accuracy of limiting the camera body. In addition, the second positioning member is used to reduce a deviation that is between the center of the light-incident surface of the camera body and the center of the light-transmitting window on the first wall plate and that occurs when the position of the camera body deviates toward a direction close to the second sidewall, to ensure the appearance fineness of the electronic device.

In a possible implementation of the first aspect, the bracket further includes a third side surface. The third side surface is connected between the first surface and the second surface, and the third side surface is connected to an end that is of the first side surface and that is away from the second side surface. The camera body is further located on a side that the third side surface faces. The electronic device further includes a third positioning member. The third positioning member is located between the third side surface and the camera body, and the third positioning member includes a third positioning member body. The third positioning member body is disposed on the third side surface. An end that is of the third positioning member body and that faces the first wall plate is defined as a fifth end, and an end that is of the third positioning member body and that faces away from the first wall plate is defined as a sixth end. Based on this definition, a compressible capability of the third positioning member body gradually increases from the fifth end to the sixth end in a direction perpendicular to the third side surface. A specific structural form of the third positioning member body may be the same as the structural form of the foregoing first positioning member body. In this way, the camera body is limited on still another side in the plane parallel to the first wall plate by using the third side surface of the bracket. This can improve accuracy of limiting the camera body. In addition, the third positioning member may be used to reduce a deviation that is between the center of the light-incident surface of the camera body and the center of the light-transmitting window on the first wall plate and that occurs when the position of the camera body deviates close to the third sidewall, to ensure the appearance fineness of the electronic device.

In a possible implementation of the first aspect, the bracket further includes a fourth side surface. The fourth side surface is connected between the first surface and the second surface, and the fourth side surface is opposite to the first side surface. The camera body is further located on a side that the fourth side surface faces. The electronic device further includes a fourth positioning member. The fourth positioning member is located between the fourth side surface and the camera body, and the fourth positioning member includes a fourth positioning member body. The fourth positioning member body is disposed on the fourth side surface. An end that is of the fourth positioning member body and that faces the first wall plate is defined as a seventh end, and an end that is of the fourth positioning member body and that faces away from the first wall plate is defined as an eighth end. Based on this definition, a compressible capability of the fourth positioning member body gradually increases from the seventh end to the eighth end in a direction perpendicular to the fourth side surface. A specific structural form of the fourth positioning member body may be the same as the structural form of the foregoing first positioning member body. In this way, the camera body is limited on still another side in the plane parallel to the first wall plate by using the fourth side surface of the bracket. This can improve accuracy of limiting the camera body. In addition, the fourth positioning member can be used to reduce a deviation that is between the center of the light-incident surface of the camera body and the center of the light-transmitting window on the first wall plate and that occurs when the position of the camera body deviates close to the fourth sidewall, to ensure the appearance fineness of the electronic device.

According to a second aspect, a positioning member is provided. The positioning member includes a positioning member body, the positioning member body includes a fastening surface and a first end and a second end that are opposite to each other, and an arrangement direction of the first end and the second end is parallel to the fastening surface. A compressible amount capability of the positioning member body gradually increases from the first end to the second end in a direction perpendicular to the fastening surface.

In this way, when the positioning member is applied to an electronic device and is mounted between a camera body of a camera and one side surface of a bracket, the fastening surface of the positioning member body in the positioning member may face the side surface, and may be disposed on the side surface. Based on this, when a position of the camera body deviates toward a direction close to the side surface, the camera body squeezes the positioning member, so that the positioning member is compressed in a direction perpendicular to the fastening surface. In addition, because the compressible capability of the positioning member body in the positioning member gradually increases from the first end to the second end, a contact surface between the positioning member and the camera body tilts toward the direction close to the side surface from the first end to the second end. Then, the camera body also tilts in a limited gap in the electronic device. In a tilt process, a light-incident end of the camera body moves a specific distance toward a direction away from the side surface. The distance can be used to compensate for, to some extent, an eccentric amount that is between a center of a light-incident surface of the camera body and a center of a light-transmitting window on a first wall plate and that is generated by compressing the positioning member, thereby improving appearance fineness of the electronic device. In addition, when the position of the camera body deviates toward the direction close to the side surface of the bracket, the contact surface between the positioning member and the camera body tilts toward the direction close to the side surface from the first end to the second end, and the first positioning member can apply, to the camera body, a tilted rebound force pointing away from the first wall plate, where the rebound force can be used to prevent the camera body from moving toward a direction close to the first wall plate. On the other hand, after a structure of the first positioning member is determined, when the position of the camera body deviates toward the direction close to the side surface, a direction of the rebound force applied by the first positioning member to the camera body is determined, so that the camera body tilts toward the determined direction. In this way, a position of the light-transmitting window on the first wall plate can be designed, so that the center of the light-transmitting window is aligned with the center of the light-incident surface of the camera body when the camera body is tightly pressed on the first positioning member.

In a possible implementation of the second aspect, the positioning member body includes: a first sidewall and a second sidewall that are disposed opposite to and spaced from each other, and a third sidewall and a fourth sidewall that are disposed opposite to and spaced from each other. A surface that is of the first sidewall and that faces away from the second sidewall forms the fastening surface. The third sidewall is connected between the first sidewall and the second sidewall, and the third sidewall forms the first end. The fourth sidewall is connected between the first sidewall and the second sidewall, and the fourth sidewall forms the second end. The first sidewall, the second sidewall, the third sidewall, and the fourth sidewall enclose an accommodating space, and at least the third sidewall and the fourth sidewall each include an elastic-plastic material. In this way, the positioning member body includes a housing structure formed by the first sidewall, the second sidewall, the third sidewall, and the fourth sidewall. The third sidewall and the fourth sidewall of the housing structure each include the elastic-plastic material. Therefore, bending deformation can be generated, so that when the housing structure is squeezed by the camera body, compression deformation can be generated in the direction perpendicular to the fastening surface. This structure is simple with fewer materials. Therefore, costs are low.

In a possible implementation of the second aspect, the first sidewall, the second sidewall, the third sidewall, and the fourth sidewall are integrally formed. In this way, forming difficulty and composition structure complexity of the positioning member body can be reduced.

In a possible implementation of the second aspect, a thickness of the third sidewall is greater than a thickness of the fourth sidewall. In this way, on a premise that the materials of the third sidewall and the fourth sidewall are the same, the fourth sidewall is more elastic and is more easily bent compared with the third sidewall, so that the compressible capability of the positioning member body gradually increases from the first end to the second end in the direction perpendicular to the fastening surface. This structure is simple and easy to implement.

In a possible implementation of the second aspect, a wall thickness of the second sidewall gradually decreases in a direction pointing from the third sidewall to the fourth sidewall; and/or a wall thickness of the first sidewall gradually decreases in a direction pointing from the third sidewall to the fourth sidewall. In this way, a width of the accommodating space also gradually increases in the direction pointing from the third sidewall to the fourth sidewall, so that the compressible capability of the positioning member body gradually increases from the first end to the second end in the direction perpendicular to the fastening surface. This structure is simple and easy to implement.

In a possible implementation of the second aspect, the wall thickness of the second sidewall decreases continuously or stepwise in the direction pointing from the third sidewall to the fourth sidewall; and/or the wall thickness of the first sidewall decreases continuously or stepwise in the direction pointing from the third sidewall to the fourth sidewall.

In a possible implementation of the second aspect, an elastic modulus of the material of the third sidewall is greater than an elastic modulus of the material of the fourth sidewall. In this way, on a premise that the thickness of the third sidewall is equal to the thickness of the fourth sidewall, the fourth sidewall is more elastic and is more easily bent compared with the third sidewall, so that the compressible capability of the positioning member body gradually increases from the first end to the second end in the direction perpendicular to the fastening surface. This structure is simple and easy to implement.

In a possible implementation of the second aspect, the accommodating space is filled with a soft elastic material, and an elastic modulus of the soft elastic material is less than an elastic modulus of the material of each of the third sidewall and the fourth sidewall. The soft elastic material includes but is not limited to silicone, rubber, foam, and sponge. In this way, structural stability of the positioning member body can be improved, and interference with a layout form for a size of the compressible capability of the positioning member body can be avoided.

In a possible implementation of the second aspect, the positioning member body includes: a first sidewall and a second sidewall that are disposed opposite to and spaced from each other, and a third sidewall connected between the first sidewall and the second sidewall. A surface that is of the first sidewall and that faces away from the second sidewall forms the fastening surface. The third sidewall forms the first end, and at least the third sidewall includes an elastic-plastic material. The first sidewall, the second sidewall, and the third sidewall enclose an accommodating space, an opening is formed at an end that is of the accommodating space and that is away from the third sidewall, and parts that are of the first sidewall and the second sidewall and that enclose the opening form the second end. In this way, a compressible capability of the second end is larger compared with the first end, so that the compressible capability of the positioning member body gradually increases from the first end to the second end in the direction perpendicular to the fastening surface. This structure is simple with fewer materials. Therefore, costs are low.

In a possible implementation of the second aspect, the positioning member body includes a plurality of elastic material layers successively stacked from the first end to the second end. "A plurality of layers" represents two or more layers. For example, there are four elastic material layers, which are respectively a first elastic material layer, a second elastic material layer, a third elastic material layer, and a fourth elastic material layer. Based on this, the plurality of elastic material layers are arranged in descending order of elastic moduli. To be specific, the elastic modulus of the second elastic material layer is less than the elastic modulus of the first elastic material layer, the elastic modulus of the third elastic material layer is less than the elastic modulus of the second elastic material layer, and the elastic modulus of the fourth elastic material layer is less than the elastic modulus of the third elastic material layer. A larger elastic modulus indicates larger rigidity, and a smaller elastic modulus indicates larger elasticity. In this way, the compressible capability of the positioning member body gradually increases from the first end to the second end in the direction perpendicular to the fastening surface. This structure is simple and easy to be manufactured.

In a possible implementation of the second aspect, a surface that is of the positioning member body and that faces away from the fastening surface is a support surface. The positioning member body is in a free state, both the support surface and the fastening surface are planes, and the support surface is parallel and opposite to the fastening surface. In this way, the positioning member body has a regular shape, thereby facilitating positioning. In some other embodiments, when the positioning member body is in the free state, the support surface may alternatively tilt at a specific angle relative to the fastening surface, or the support surface is a curved surface, for example, an arc surface.

In a possible implementation of the second aspect, the positioning member further includes a contact member, and the contact member is disposed on the support surface. The contact member is not limited by a material of the positioning member body, and may be made of a suitable material based on a requirement, to ensure support performance for the camera body.

DESCRIPTION OF EMBODIMENTS

In the embodiments of this application, the terms "first", "second", "third", "fourth", "fifth", "sixth", "seventh", and "eighth" are merely used for description, and should not be understood as an indication or implication of relative importance or an implicit indication of a quantity of the indicated technical features. Therefore, a feature defined with "first", "second", "third", "fourth", "fifth", "sixth", "seventh", or "eighth" may explicitly or implicitly include one or more features.

In the embodiments of this application, the term "include", "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. Without further limitation, an element defined with a statement "including a . . . " does not exclude existence of other identical elements in the process, method, article, or apparatus including the element.

In the embodiments of this application, the term "and/or" is merely used to describe an association relationship between associated objects, and represents that three relationships may exist. For example, A and/or B may represent that only A exists, both A and B exist, and only B exists. In addition, the character "/" in this specification usually represents an "or" relationship between the associated objects.

In the embodiments of this application, it should be noted that descriptions "vertical" and "parallel" respectively represent that approximate vertical and approximate parallel within a specific error range are allowed, and the error range may be a range in which an angle of a deviation relative to each of absolute vertical and absolute parallel is less than or equal to 5°, 8°, or 10°. This is not specifically limited herein.

This application provides an electronic device. The electronic device is an electronic device having a shooting function. Specifically, the electronic device may be a portable electronic apparatus or another suitable electronic apparatus. For example, the electronic device may be a mobile phone, a tablet personal computer (tablet personal computer), a laptop computer (laptop computer), a personal digital assistant (personal digital assistant, PDA), a monitor, a camera, a personal computer, a notebook computer, an in-vehicle device, a wearable device, augmented reality (augmented reality, AR) glasses, an AR helmet, virtual reality (virtual reality, VR) glasses, a VR helmet, or the like.

Figure 1:
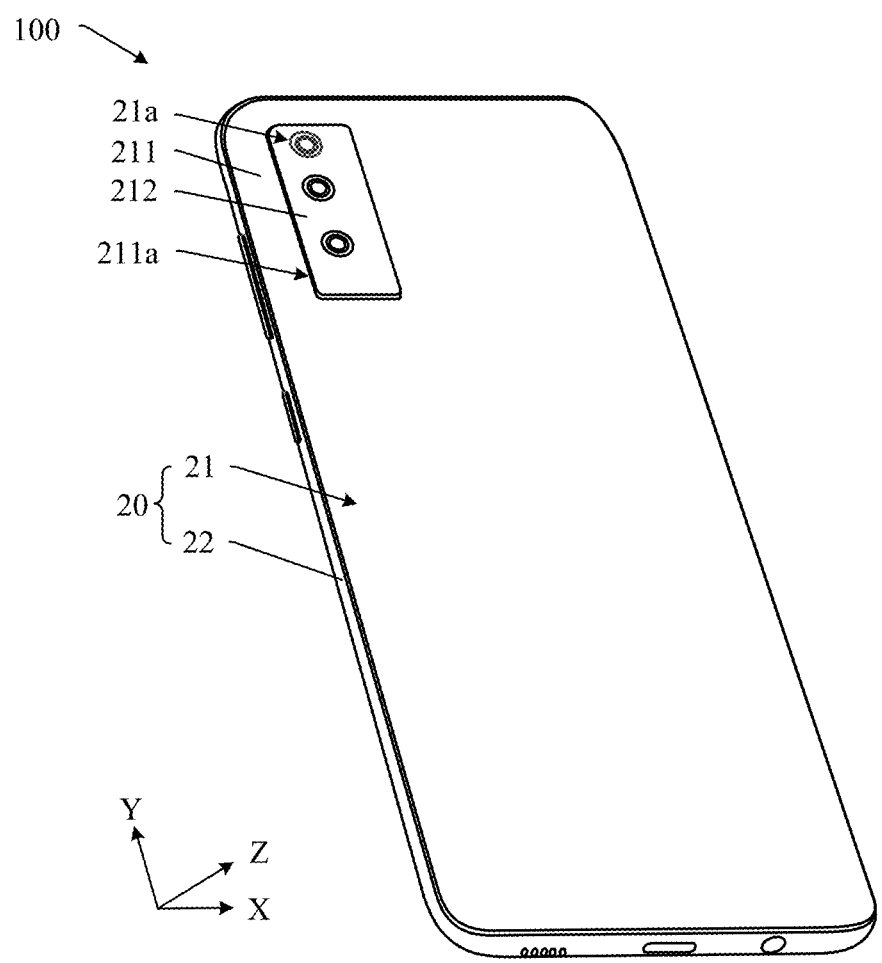
FIG. 1 is a three-dimensional diagram of an electronic device according to some embodiments of this application.

FIG. 1 is a three-dimensional diagram of an electronic device 100 according to some embodiments of this application. This embodiment and the following embodiments are described with an example in which the electronic device 100 is a mobile phone. The electronic device 100 is approximately in a rectangular plate shape. Based on this, for ease of description of the following embodiments, an XYZ coordinate system is established, a width direction of the electronic device 100 is defined as an X-axis direction, a length direction of the electronic device 100 is defined as a Y-axis direction, and a thickness direction of the electronic device 100 is defined as a Z-axis direction. It may be understood that the coordinate system of the electronic device 100 may be flexibly set based on an actual requirement. This is not specifically limited herein. In some other embodiments, a shape of the electronic device 100 may alternatively be a square flat plate, a circular flat plate, an oval flat plate, or the like. This is not specifically limited herein.

Figure 2:
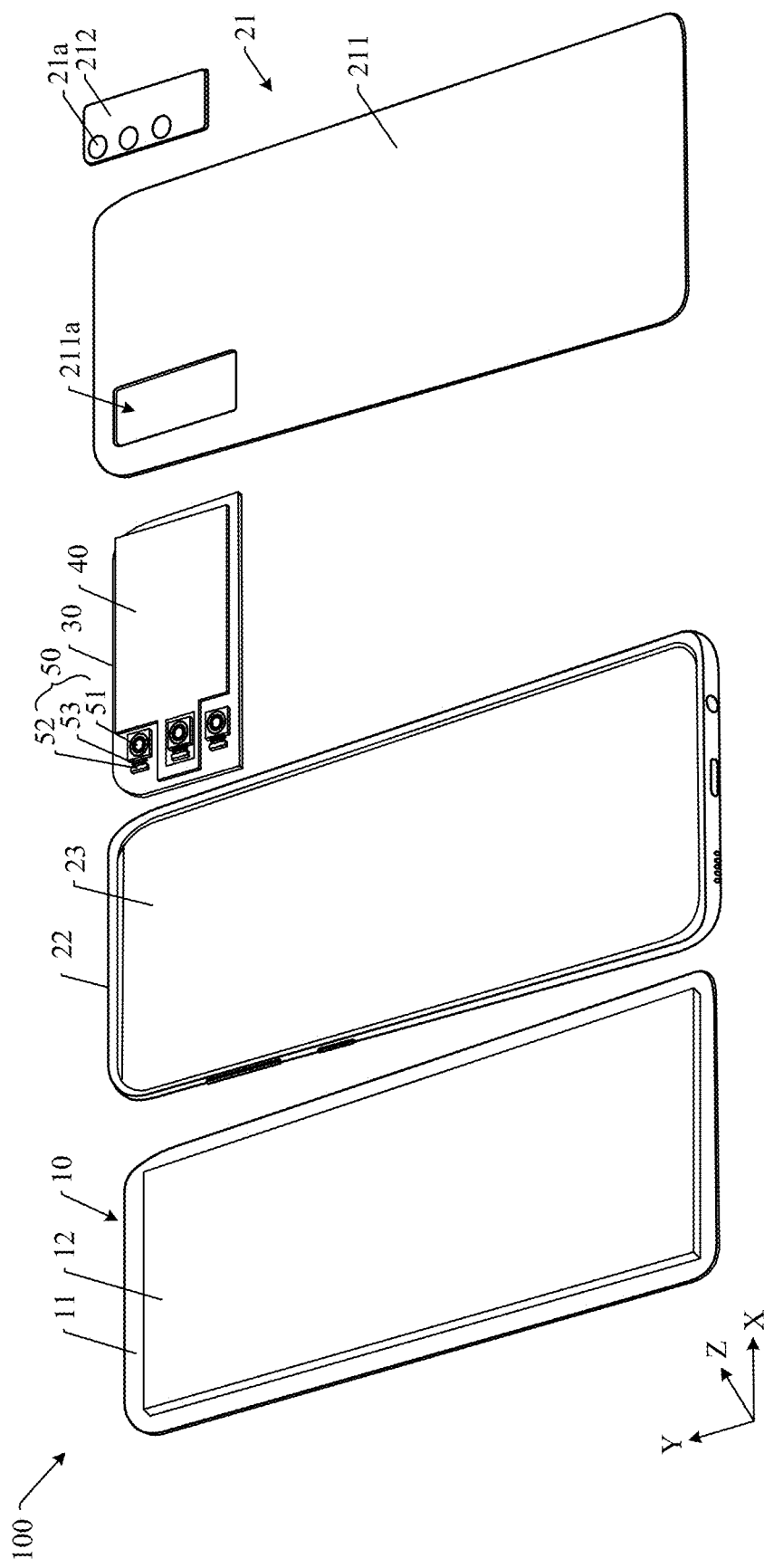
FIG. 2 is a schematic diagram of an exploded structure of the electronic device shown in FIG. 1.

Refer to FIG. 1 and FIG. 2. FIG. 2 is a schematic diagram of an exploded structure of the electronic device 100 shown in FIG. 1. In this embodiment, the electronic device 100 includes a screen 10, a back housing 20, a circuit board 30, a bracket 40, and a camera 50.

It may be understood that FIG. 1 and FIG. 2 schematically show only some components included in the electronic device 100. Actual shapes, actual sizes, actual positions, and actual constructions of these components are not limited by those in FIG. 1 and FIG. 2. In some other examples, the electronic device 100 may alternatively not include the screen 10.

The screen 10 is configured to display an image, a video, or the like. The screen 10 includes a light-transmitting cover plate 11 and a display 12 (referred to as a display panel). The light-transmitting cover plate 11 and the display 12 are stacked. The light-transmitting cover plate 11 is mainly configured to protect the display 12 and prevent dust. A material of the light-transmitting cover plate 11 includes but is not limited to glass. The display 12 may be a flexible display, or may be a rigid display. For example, the display 12 may be an organic light-emitting diode (organic light-emitting diode, OLED) display, an active-matrix organic light-emitting diode or an active-matrix organic light-emitting diode (active-matrix organic light-emitting diode, AMOLED) display, a mini organic light-emitting diode (mini organic light-emitting diode) display, a micro organic light-emitting diode (micro organic light-emitting diode) display, a micro organic light-emitting diode (micro organic light-emitting diode) display, a quantum dot light-emitting diode (quantum dot light emitting diode, QLED) display, or a liquid crystal display (liquid crystal display, LCD).

The back housing 20 forms a housing of the electronic device, and is configured to protect internal electronic devices in the electronic device 100. The back housing 20 may include a back cover 21 and a frame 22. The back cover 21 is a wall plate of the housing of the electronic device. Specifically, the back cover 21 forms a first wall plate of the housing of the electronic device. It should be noted that when the electronic device 100 is another device (for example, a monitor or a camera), the first wall plate of the housing of the electronic device may alternatively be formed by another structure. This is not limited herein. The back cover 21 is located on a side that is of the display 12 and that is away from the light-transmitting cover plate 11, and is stacked with and spaced from the light-transmitting cover plate 11 and the display 12. The frame 22 is located between the back cover 21 and the light-transmitting cover plate 11. The frame 22 is fastened to the back cover 21. For example, the frame 22 may be fixedly connected to the back cover 21 by using adhesive, or the frame 22 and the back cover 21 may be of an integrally formed structure, that is, the frame 22 and the back cover 21 are an integral structural part. The light-transmitting cover plate 11 may be fastened to the frame 22 by using adhesive. The light-transmitting cover plate 11, the back cover 21, and the frame 22 enclose an internal accommodating space of the electronic device 100. The internal accommodating space accommodates the display 12, the circuit board 30, the bracket 40, and the camera 50.

Refer to FIG. 2. In some embodiments, the back housing 20 may further include a middle plate 23. The middle plate 23 is disposed in the internal accommodating space, and the middle plate 23 is located on the side that is of the display 12 and that is away from the light-transmitting cover plate 11. An edge of the middle plate 23 is fastened to the frame 22. In some embodiments, the edge of the middle plate 23 is fastened to the frame 22 by using adhesive. The middle plate 23 and the frame 22 may alternatively be of an integrally formed structure, that is, the middle plate 23 and the frame 22 are an integral structural part. The middle plate 23 separates the internal accommodating space into two mutually independent spaces. One of the spaces is located between the light-transmitting cover plate 11 and the middle plate 23, and the display 12 is located in this part of space. The other of the spaces is located between the middle plate 23 and the back cover 21, and the circuit board 30, the bracket 40, and the camera 50 are accommodated in this part of space. It should be noted that an entirety formed by connecting the middle plate 23 to the frame 22 is also referred to as a middle frame. In some other embodiments, the back housing 20 may alternatively not include the middle plate 23.

The circuit board 30 is fastened inside the electronic device 100, and is stacked with and spaced from the back cover 21. Refer to FIG. 2. In some embodiments, the circuit board 30 is located between the middle plate 23 and the back cover 21, and is fastened to the middle plate 23.

The circuit board 30 is configured to set electronic components and implement an electrical connection between the electronic components. The electronic components may be, for example, a central processing unit (central processing unit, CPU), a graphics processing unit (graphics processing unit, GPU), a universal flash storage (universal flash storage, UFS), a handset, and a flash module.

The bracket 40 is disposed inside the electronic device 100. Specifically, the bracket 40 is disposed between the circuit board 30 and the back cover 21. In some embodiments, the bracket 40 may be a circuit board bracket, and the bracket 40 is fastened to the middle plate 23. The bracket 40 is configured to protect the circuit board 30, and plays a Z-direction stop and limit function for some electronic components (for example, the flash module) that are connected by using non-fixed structures such as a flexible printed circuit (flexible printed circuit, FPC) and a spring sheet and that are on a surface that is of the circuit board 30 and that faces the back cover 21, to prevent these electronic components from moving relative to the circuit board 30 in a process of opening the back cover 21 to maintain the electronic device 100.

The camera 50 is configured to shoot a video or an image. The camera 50 includes but is not limited to a main camera, a wide-angle camera, and a long-focus camera, and a structural form of the camera 50 includes but is not limited to an upright camera and a periscope camera. Still refer to FIG. 2. The camera 50 includes a camera body 51, an electrical connection terminal 52, and a flexible electrical connection structure 53. The camera body 51 is a main body for shooting a video or an image. The camera body 51 has a light-incident surface, and the light-incident surface may be a light-incident surface of an optical lens in the camera body 51. The light-incident surface of the camera body 51 faces the back cover 21. Based on this, a light-transmitting window 21a is disposed on the back cover 21. In some embodiments, the back cover 21 may include a back cover body 211 and a camera decoration member 212. A mounting opening 211a is disposed on the back cover body 211, and the camera decoration member 212 is fastened in the mounting opening 211a. The light-transmitting window 21a is disposed on the camera decoration member 212. The light-incident surface of the camera body 51 faces the light-transmitting window 21a, so that external scene light can enter the camera body 51 through the light-transmitting window 21a, thereby implementing external video or image shooting of the electronic device.

Based on this, the electrical connection terminal 52 is fixedly and electrically connected to the circuit board 30, and the flexible electrical connection structure 53 is connected between the camera body 51 and the electrical connection terminal 52, to implement a signal connection between the camera body 51 and the electrical connection terminal 52. The flexible electrical connection structure 53 includes but is not limited to an FPC or a structure formed through weaving of a conducting wire and a flexible material. This is not specifically limited herein.

In the foregoing embodiment, because the flexible electrical connection structure 53 is a flexible structure, when the electrical connection terminal 52 is fastened to the circuit board 30, a position of the camera body 51 relative to the circuit board 30 is not fixed. Therefore, the camera body 51 needs to be limited by using another structure, to fix a position of the camera body 51 in the electronic device 100. Specifically, the camera body 51 may be limited in the Z-axis direction by using the circuit board 30 and the camera decoration member 212. Based on this, the camera body 51 may be limited in an XY plane by using the bracket 40.

Figure 3:
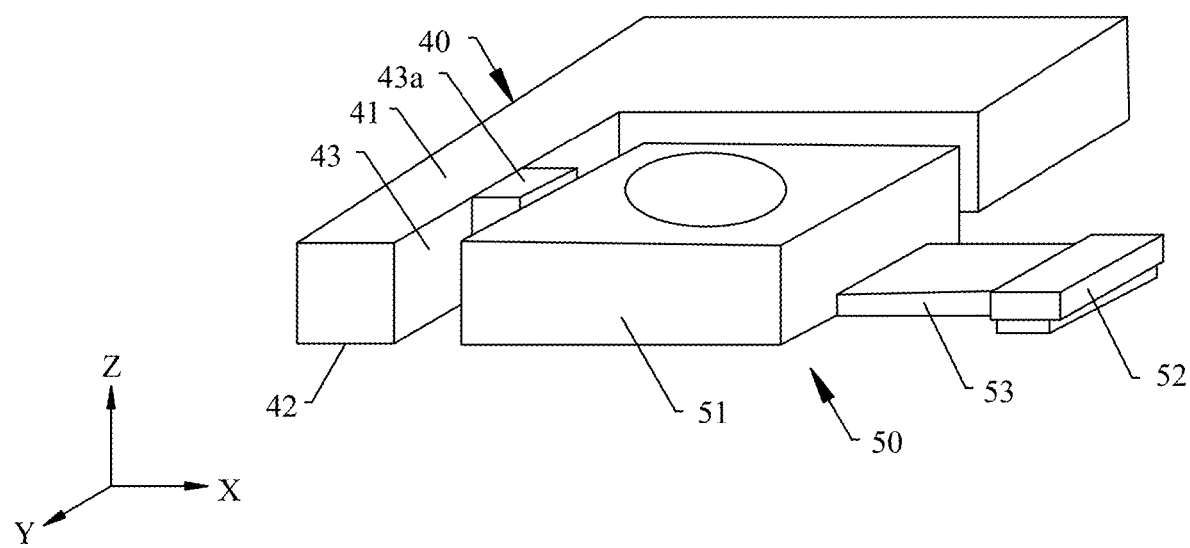
FIG. 3 is a schematic diagram of an assembled structure of a circuit board bracket and a camera in the electronic device shown in FIG. 2.

For example, FIG. 3 is a schematic diagram of an assembled structure of the bracket 40 and the camera 50 in the electronic device 100 shown in FIG. 2. In this embodiment, a surface that is of the bracket 40 and that faces the back cover 21 is defined as a first surface 41, and a surface that is of the bracket 40 and that faces away from the back cover 21 is defined as a second surface 42. Based on this, the bracket 40 further includes a first side surface 43. The first side surface 43 is connected between the first surface 41 and the second surface 42. In some embodiments, the first side surface 43 may be parallel to the Z-axis direction, or may tilt at a specific angle relative to the Z-axis direction. This is not specifically limited herein. The camera body 51 is located on a side that the first side surface 43 faces. In this way, the camera body 51 may be limited on a side in the XY plane by using the first side surface 43, to limit the position of the camera body 51 in the electronic device 100.

It should be noted that, to ensure appearance fineness of the electronic device 100, the position of the camera body 51 in the electronic device 100 should be set to ensure that a center of the light-incident surface of the camera body 51 is approximately opposite to a center of the light-transmitting window 21a on the back cover 21. Based on this, because the bracket 40 has a large size, size precision of the bracket 40 cannot be ensured in a manufacturing process, and precision of directly limiting the camera body 51 by using the first side surface 43 is low. In this case, an eccentric case easily occurs. Still refer to FIG. 3. To avoid this problem, an elastic block 43a may be fastened to the first side surface 43.

Compared with the bracket 40, the elastic block 43a has a smaller size, so that a deviation is compensated for by using a size design. In this way, when the camera body 51 contacts the elastic block 43a, the center of the light-incident surface of the camera body 51 can be approximately opposite to the center of the light-transmitting window 21a on the back cover 21. In addition, the elastic block 43a has elasticity, which can avoid hard contact with the camera body 51 and scraping the camera body 51. However, when the position of the camera body 51 deviates toward a direction close to the first side surface 43, the elastic block 43a is squeezed. The elastic block 43a is compressed to some extent. In this case, a specific deviation still exists between the center of the light-incident surface of the camera body 51 and the center of the light-transmitting window 21a. Consequently, the appearance fineness of the electronic device 100 cannot be effectively ensured.

Figure 4:
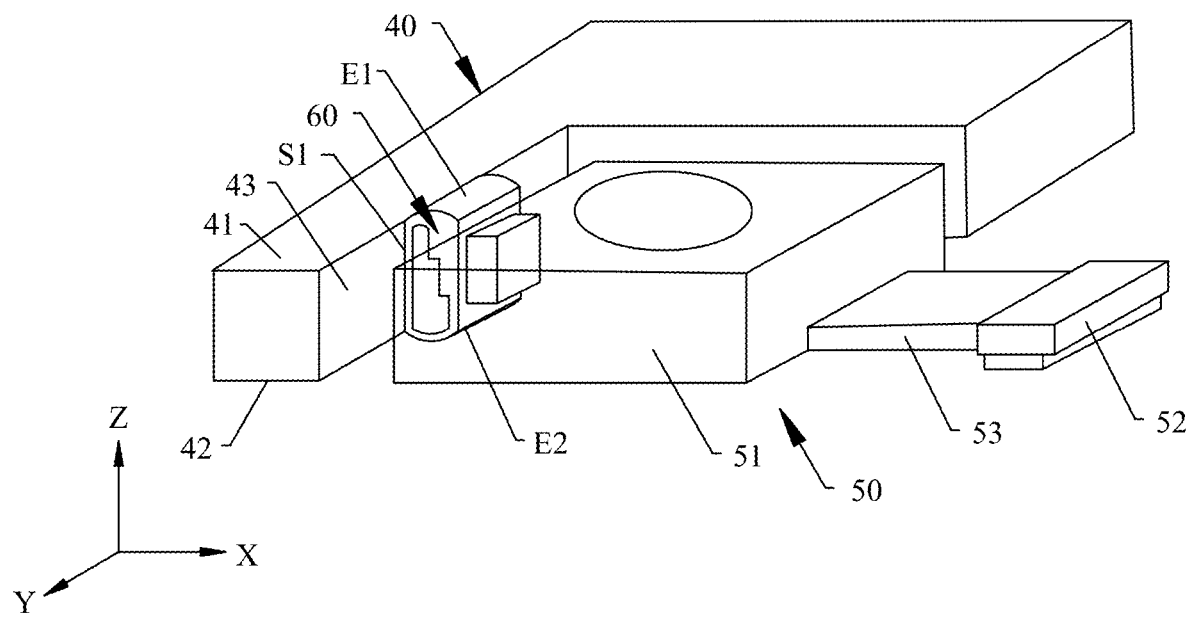
FIG. 4 is a schematic diagram of an assembled structure of a circuit board bracket and a camera in an electronic device according to some other embodiments of this application.

Based on this, to reduce an eccentric amount and improve the appearance fineness of the electronic device 100, FIG. 4 is a schematic diagram of an assembled structure of the bracket 40 and the camera 50 in the electronic device 100 according to some other embodiments of this application. In this embodiment, the electronic device 100 includes a first positioning member 60. The first positioning member 60 is located between the first side surface 43 and the camera body 51, and the first positioning member 60 includes a first positioning member body. The first positioning member 60 is disposed on the first side surface 43. Specifically, a surface that is of the first positioning member body and that faces the first side surface 43 is defined as a fastening surface S1. In some embodiments, the fastening surface S1 is a plane. The first positioning member body may be disposed on the first side surface 43 by using the fastening surface S1. Specifically, the fastening surface S1 may be fastened to the first side surface 43, may be slidably connected to the first side surface 43, or the like. When the fastening surface S1 is fastened to the first side surface 43, specifically, the fastening surface S1 may be fastened to the first side surface 43 by using adhesive, or may be fastened to the first side surface 43 in a manner of welding, thread connection, clamping, riveting, or the like.

In addition, an end that is of the first positioning member body and that faces the back cover 21 is defined as a first end E1, and an end that is of the first positioning member body and that faces away from the back cover 21 is defined as a second end E2. In some embodiments, an arrangement direction of the first end E1 and the second end E2 is approximately parallel to the fastening surface S1.

Based on the foregoing definition, a compressible capability of the first positioning member body gradually increases from the first end E1 to the second end E2 in a direction perpendicular to the first side surface 43. To be specific, the first positioning member body is divided into a plurality of parts successively arranged from the first end E1 to the second end E2, for example, is divided into a 1st part, . . . , and an Nth part that are successively arranged from the first end E1 to the second end E2. N is a positive integer greater than or equal to 2. Based on this, compressible capabilities of the 1st part, . . . , and the Nth part successively increase in the direction perpendicular to the first side surface 43. To be specific, a compressible capability of an nth part in the direction perpendicular to the first side surface 43 is greater than a compressible capability of an (n−1)th part in the direction perpendicular to the first side surface 43. n is a positive integer greater than 1 and less than or equal to N.

It should be noted that in the foregoing embodiment, the "compressible capability" is a capability of generating compression deformation when a same pressure is applied. Specifically, when a same acting force is applied, if a larger amount of compression deformation is generated, a compressible capability is greater; and if a smaller amount of compression deformation is generated, a compressible capability is smaller.

In this way, when the position of the camera body 51 deviates toward the direction close to the first side surface 43, the camera body 51 squeezes the first positioning member 60, so that the first positioning member 60 is compressed as a whole in the direction perpendicular to the first side surface 43. In addition, because the compressible capability of the first positioning member body in the first positioning member 60 gradually increases from the first end E1 to the second end E2, a contact surface between the first positioning member 60 and the camera body 51 tilts toward the direction close to the first side surface 43 from the first end E1 to the second end E2. Then, the camera body 51 also tilts in a limited gap between the back cover 21 and the circuit board 30. In a tilt process, a light-incident end of the camera body 51 moves a specific distance toward a direction away from the first side surface 43. The distance can be used to compensate for, to some extent, the eccentric amount that is between the center of the light-incident surface of the camera body 51 and the center of the light-transmitting window 21a on the back cover 21 and that is generated by compressing the first positioning member 60 as a whole, thereby improving the appearance fineness of the electronic device 100. The light-incident end of the camera body 51 is an end part of an end in which the light-incident surface of the camera body 51 is located.

Figure 5:
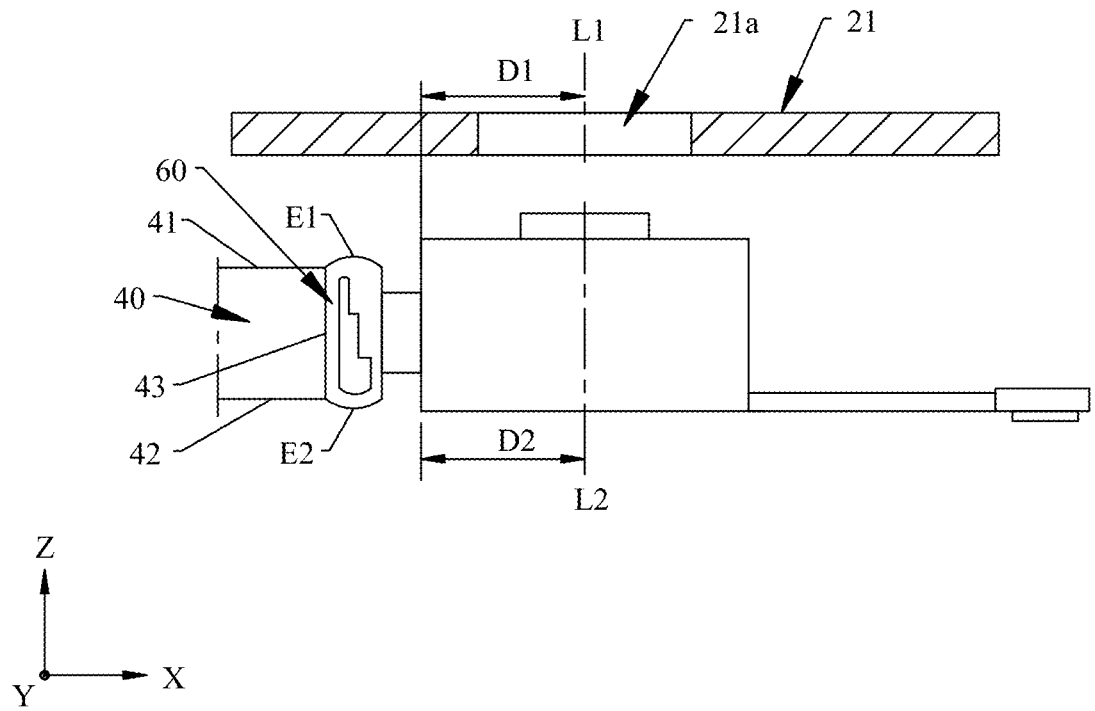
FIG. 5 is a schematic diagram of a structure in which a position of a camera body in the assembled structure shown in FIG. 4 does not deviate toward a direction close to a first side surface.

The following further describes the foregoing technical effects with reference to the accompanying drawings. FIG. 5 is a schematic diagram of a structure in which the position of the camera body 51 in the assembled structure shown in FIG. 4 does not deviate toward the direction close to the first side surface 43. In this state, the camera body 51 may be spaced from the first positioning member 60, or may be in contact with the first positioning member 60 without compression. A distance between a central axis L1 of the light-transmitting window 21a on the back cover 21 and a surface that is of the first positioning member 60 and that faces the camera body 51 is defined as a first distance D1, and a distance between a central axis L2 of the light-incident surface of the camera body 51 and a surface that is of the camera body 51 and that faces the first side surface 43 is defined as a second distance D2. The first distance D1 may be designed to be approximately equal to the second distance D2. The central axis L1 is a straight line that passes through the center of the light-transmitting window 21a and that is perpendicular to a plane in which the light-transmitting window 21a is located. Correspondingly, the central axis L2 is a straight line that passes through the center of the light-incident surface and that is perpendicular to the light-incident surface. In this way, the camera body 51 can be positioned by using the first positioning member 60, so that the center of the light-incident surface of the camera body 51 is approximately opposite to the center of the light-transmitting window 21a.

Based on this, when the position of the camera body 51 deviates toward the direction close to the first side surface 43, the camera body 51 squeezes the first positioning member 60, so that the first positioning member 60 is compressed and deformed. A compression deformation manner of the first positioning member 60 is superposition of two manners.

Figure 6:
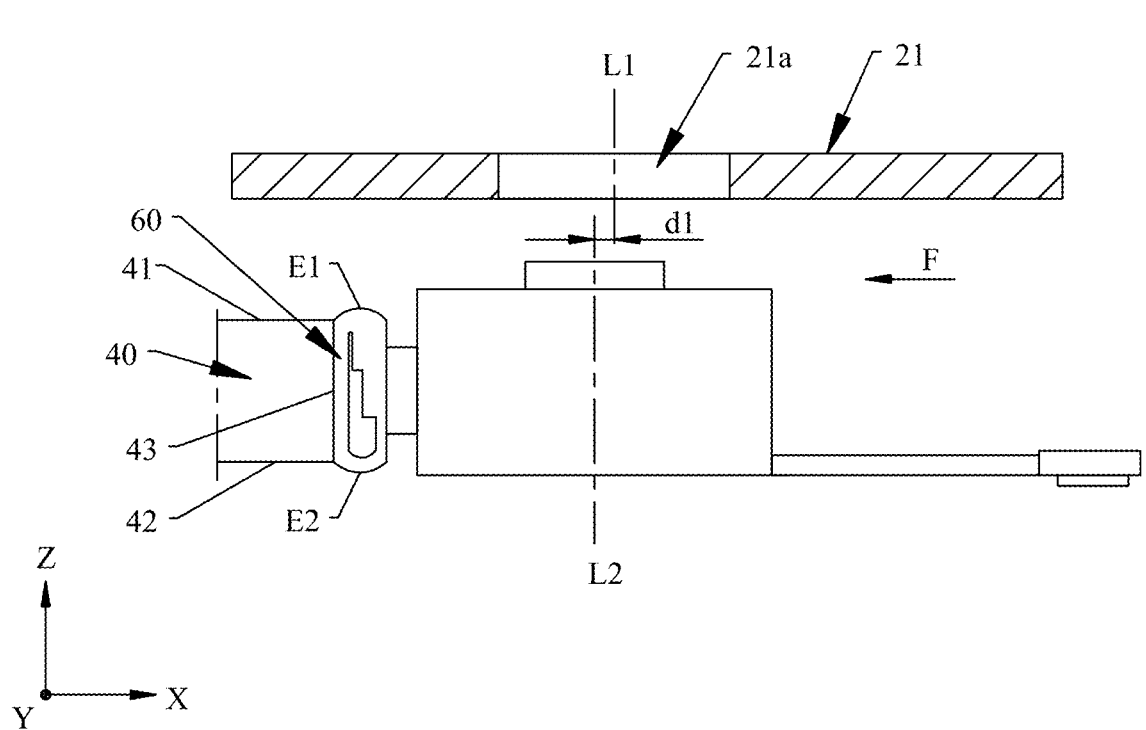
FIG. 6 is a schematic diagram of a structure of an overall equivalent compression manner of a first positioning member when the camera body shown in FIG. 5 squeezes the first positioning member.

In one manner, the first positioning member 60 is equivalently compressed as a whole in a direction F perpendicular to the first side surface 43. FIG. 6 is a schematic diagram of a structure of an overall equivalent compression manner of the first positioning member 60 when the camera body 51 shown in FIG. 5 squeezes the first positioning member 60. An amount of the equivalent compression causes a specific deviation d1 between the center of the light-incident surface of the camera body 51 and the center of the light-transmitting window 21a.

Figure 7:
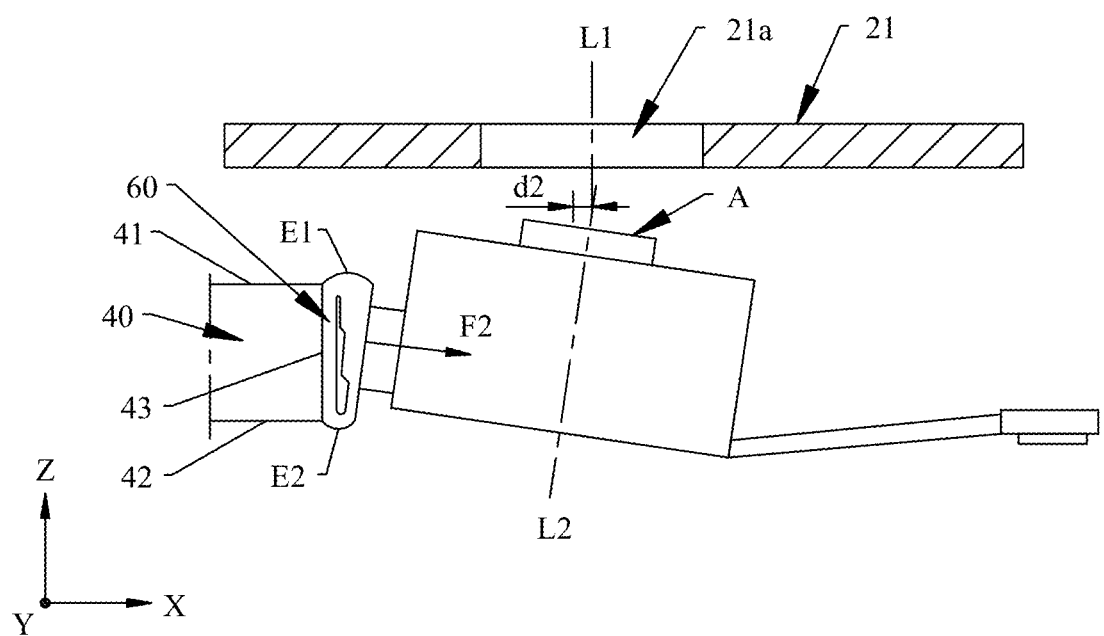
FIG. 7 is a schematic diagram of a structure of a compression manner in which a compression amount of a first positioning member gradually increases from a first end to a second end when the camera body shown in FIG. 5 squeezes the first positioning member.

In another manner, because the compressible capability of the first positioning member body in the first positioning member 60 gradually increases from the first end E1 to the second end E2, a compression amount of the first positioning member 60 gradually increases from the first end E1 to the second end E2. In this way, a compression surface between the first positioning member 60 and the camera body 51 tilts toward the direction close to the first side surface 43 from the first end E1 to the second end E2. Then, the camera body 51 also tilts in a limited gap between the back cover 21 and the circuit board 30. FIG. 7 is a schematic diagram of a structure of a compression manner in which the compression amount of the first positioning member 60 gradually increases from the first end E1 to the second end E2 when the camera body 51 shown in FIG. 5 squeezes the first positioning member 60. In a tilt process, the light-incident end A of the camera body 51 moves a specific distance d2 toward the direction away from the first side surface 43, and the distance d2 can be used to compensate for the deviation d1 to some extent, thereby reducing the eccentric amount, and improving the appearance fineness of the electronic device 100.

In addition, when the position of the camera body 51 deviates toward the direction close to the first side surface 43, the contact surface between the first positioning member 60 and the camera body 51 tilts toward the direction close to the first side surface 43 from the first end E1 to the second end E2. The first positioning member 60 can apply, to the camera body 51, a tilted rebound force F2 pointing away from the back cover 21, where the rebound force F2 can be used to prevent the camera body 51 from moving toward a direction close to the back cover 21.

On the other hand, after a structure of the first positioning member 60 is determined, when the position of the camera body 51 deviates toward the direction close to the first side surface 43, a direction of the rebound force F2 applied by the first positioning member 60 to the camera body 51 is determined, so that the camera body 51 tilts toward the determined direction. In this way, a position of the light-transmitting window on the back cover 21 can be designed, so that the center of the light-transmitting window 21a is aligned with the center of the light-incident surface of the camera body 51 when the camera body 51 is tightly pressed on the first positioning member 60.

In the foregoing embodiment, to gradually increase the compressible capability of the first positioning member body in the first positioning member 60 from the first end E1 to the second end E2 in the direction perpendicular to the first side surface 43, materials with different elastic moduli may be used to manufacture the first positioning member body, or the foregoing objective may be achieved in a structural design manner. The following describes a plurality of different first positioning member bodies by using embodiments, and the following Embodiment 1 to Embodiment 3 are specifically included.

Figure 8:
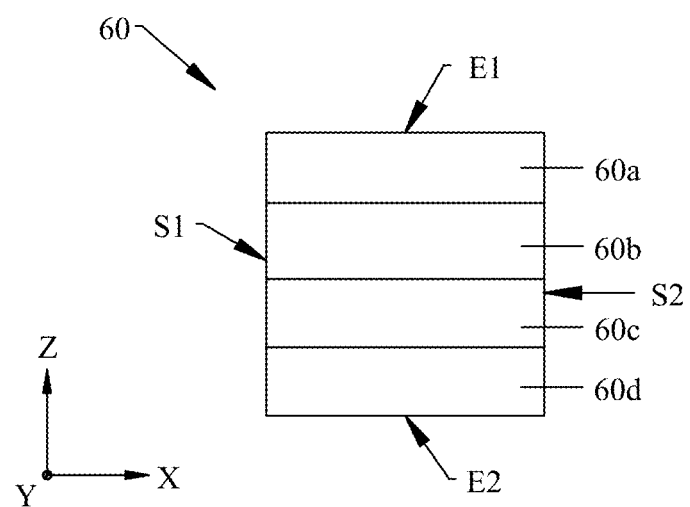
FIG. 8 is a schematic diagram of a structure of a first positioning member according to some embodiments of this application.

Embodiment 1: FIG. 8 is a schematic diagram of a structure of the first positioning member 60 according to some embodiments of this application. In this example, the first positioning member body in the first positioning member 60 includes a plurality of elastic material layers that are successively stacked from the first end E1 to the second end E2. "A plurality of layers" represents two or more layers. In the embodiment shown in FIG. 8, there are four elastic material layers, which are respectively a first elastic material layer 60a, a second elastic material layer 60b, a third elastic material layer 60c, and a fourth elastic material layer 60d. Based on this, the plurality of elastic material layers are arranged in descending order of elastic moduli. To be specific, the elastic modulus of the second elastic material layer 60b is less than the elastic modulus of the first elastic material layer 60a, the elastic modulus of the third elastic material layer 60c is less than the elastic modulus of the second elastic material layer 60b, and the elastic modulus of the fourth elastic material layer 60d is less than the elastic modulus of the third elastic material layer 60c.

Figure 9:
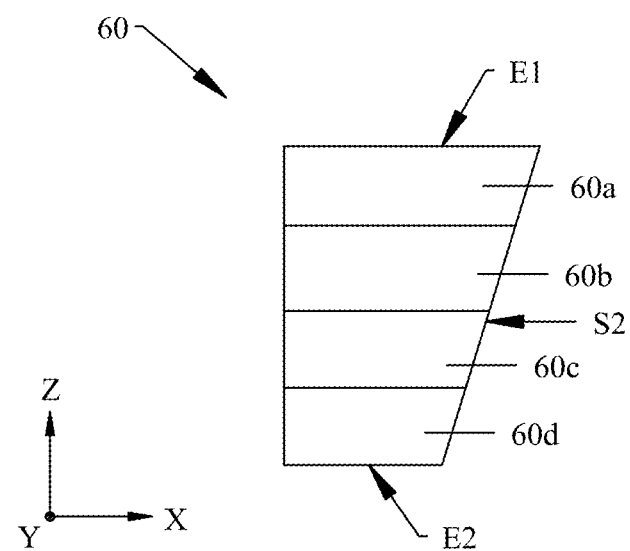
FIG. 9 is a schematic diagram of a structure obtained after the first positioning member shown in FIG. 8 is squeezed by a camera body.

A larger elastic modulus indicates larger rigidity, and a smaller elastic modulus indicates larger elasticity. In this way, when the first positioning member 60 is applied to the electronic device 100, the compressible capability of the first positioning member body gradually increases from the first end E1 to the second end E2 in the direction perpendicular to the first side surface 43. FIG. 9 is a schematic diagram of a structure obtained after the first positioning member 60 shown in FIG. 8 is squeezed by the camera body 51. This structure is simple and easy to be manufactured.

Figure 10:
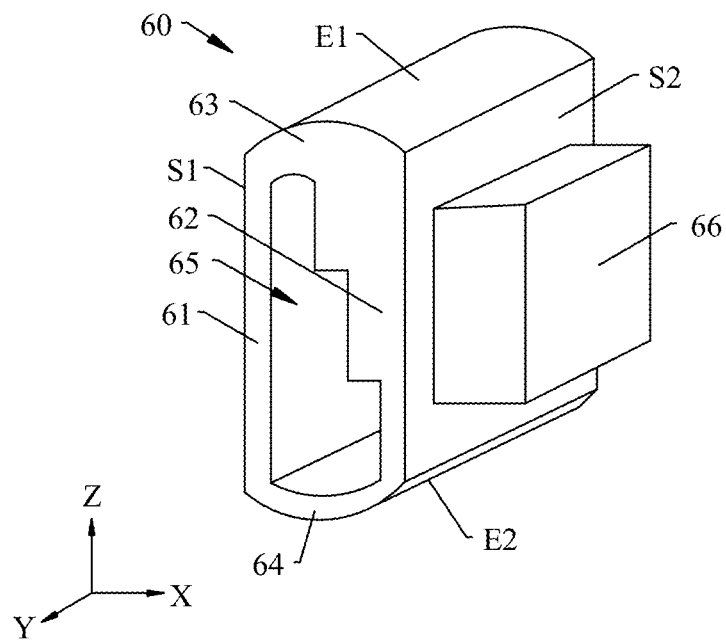
FIG. 10 is a three-dimensional diagram of a first positioning member in the assembled structure shown in FIG. 4.

Embodiment 2: FIG. 10 is a three-dimensional diagram of the first positioning member 60 in the assembled structure shown in FIG. 4. In this embodiment, the first positioning member body in the first positioning member 60 includes: a first sidewall 61 and a second sidewall 62 that are disposed opposite to and spaced from each other, and a third sidewall 63 and a fourth sidewall 64 that are disposed opposite to and spaced from each other.

When the first positioning member 60 is applied to the electronic device, and is disposed between the first side surface 43 and the camera body 51, the first sidewall 61 is located between the first side surface 43 and the second sidewall 62. In some embodiments, a surface that is of the first sidewall 61 and that faces away from the second sidewall 62 forms the fastening surface S1. When the first positioning member 60 is mounted between the first side surface 43 of the bracket 40 and the camera body 51, the fastening surface S1 faces the first side surface 43. The fastening surface S1 is disposed on the first side surface 43. The second sidewall 62 is located between the first sidewall 61 and the camera body 51.

The third sidewall 63 is connected between the first sidewall 61 and the second sidewall 62, and the third sidewall 63 forms the first end E1 of the first positioning member body. The fourth sidewall 64 is connected between the first sidewall 61 and the second sidewall 62, and the fourth sidewall 64 forms the second end E2 of the first positioning member body.

The first sidewall 61, the second sidewall 62, the third sidewall 63, and the fourth sidewall 64 enclose an accommodating space 65, and at least the third sidewall 63 and the fourth sidewall 64 each include an elastic-plastic material. The elastic-plastic material includes but is not limited to at least one of plastic, silicone, or spring steel.

In this way, the first positioning member body includes a housing structure formed by the first sidewall 61, the second sidewall 62, the third sidewall 63, and the fourth sidewall 64. The third sidewall 63 and the fourth sidewall 64 of the housing structure each include the elastic-plastic material.

Therefore, bending deformation can be generated, so that when the housing structure is squeezed by the camera body 51, compression deformation can be generated in the direction perpendicular to the first side surface 43. This structure is simple with fewer materials. Therefore, costs are low.

Materials of the first sidewall 61, the second sidewall 62, the third sidewall 63, and the fourth sidewall 64 may be the same, that is, the first sidewall 61, the second sidewall 62, the third sidewall 63, and the fourth sidewall 64 each include an elastic-plastic material, for example, each are made of plastic, and are formed integrally. In this way, forming difficulty and composition structure complexity of the first positioning member body can be reduced.

Based on this, to gradually increase the compressible capability of the first positioning member body in the first positioning member 60 from the first end E1 to the second end E2 in the direction perpendicular to the first side surface 43, one of or a combination of a plurality of the following first implementation to the following fourth implementation may be used for implementation.

Figure 11:
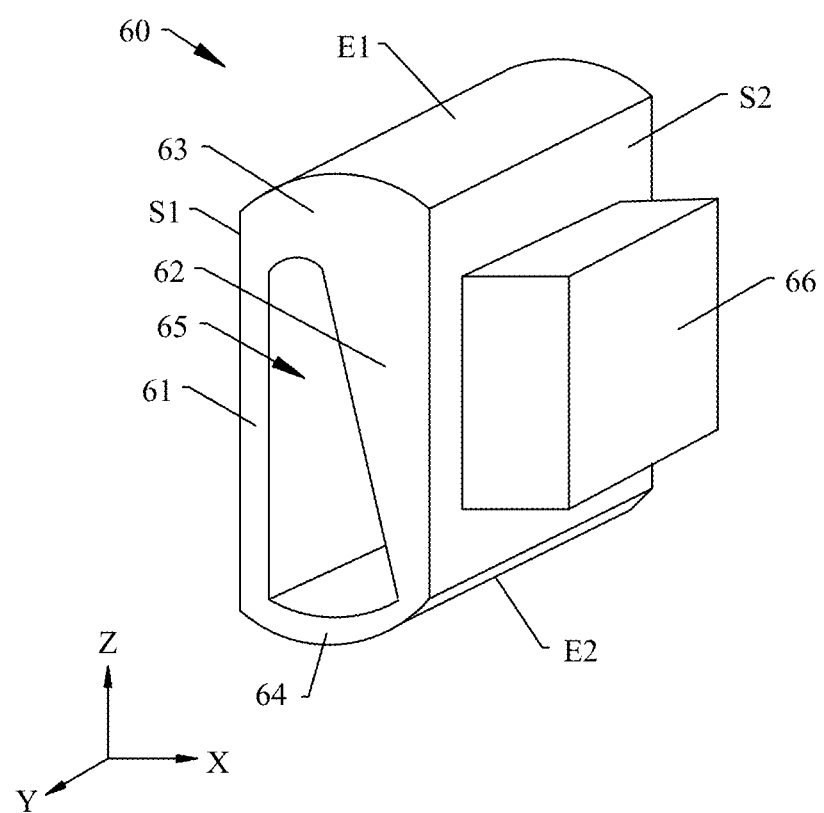
FIG. 11 is a three-dimensional diagram of a first positioning member according to some other embodiments of this application.

First implementation: Still refer to FIG. 10. A wall thickness of the second sidewall 62 gradually decreases in a direction pointing from the third sidewall 63 to the fourth sidewall 64, namely, a –Z-axis direction (that is, a direction opposite to a direction pointed by a Z-axis arrow). A reduction manner includes at least one of continuous reduction and stepwise reduction. FIG. 10 shows an example in which the wall thickness of the second sidewall 62 is reduced stepwise. In some other examples, FIG. 11 is a three-dimensional diagram of the first positioning member 60 according to some other embodiments of this application. In this example, the wall thickness of the second sidewall 62 decreases continuously.

Figure 12:
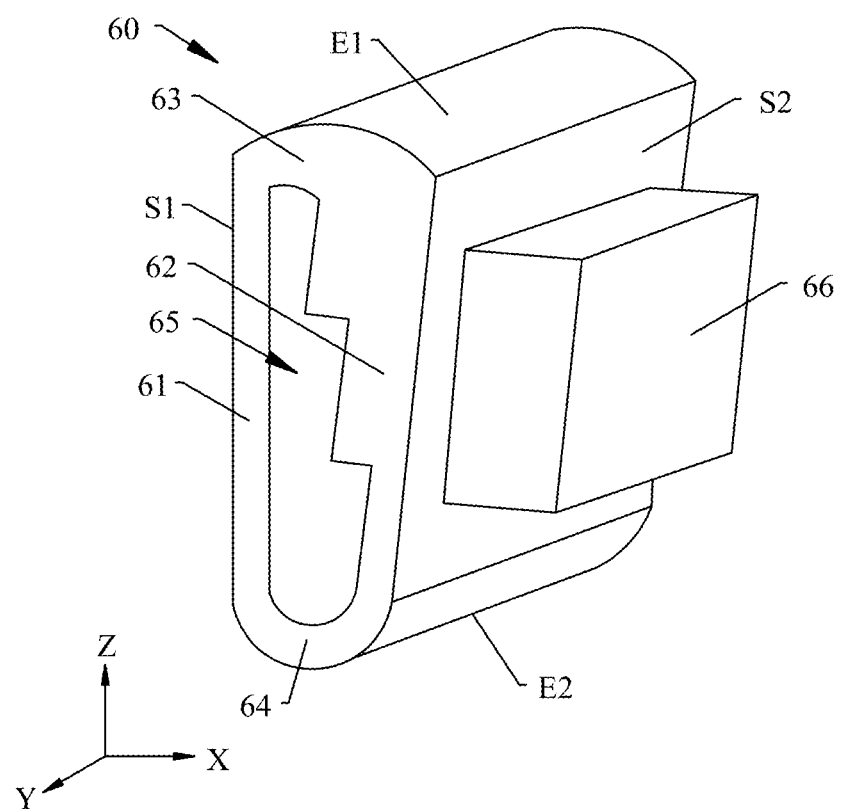
FIG. 12 is a schematic diagram of a structure obtained after the first positioning member shown in FIG. 10 is squeezed by a camera body.
Figure 13:
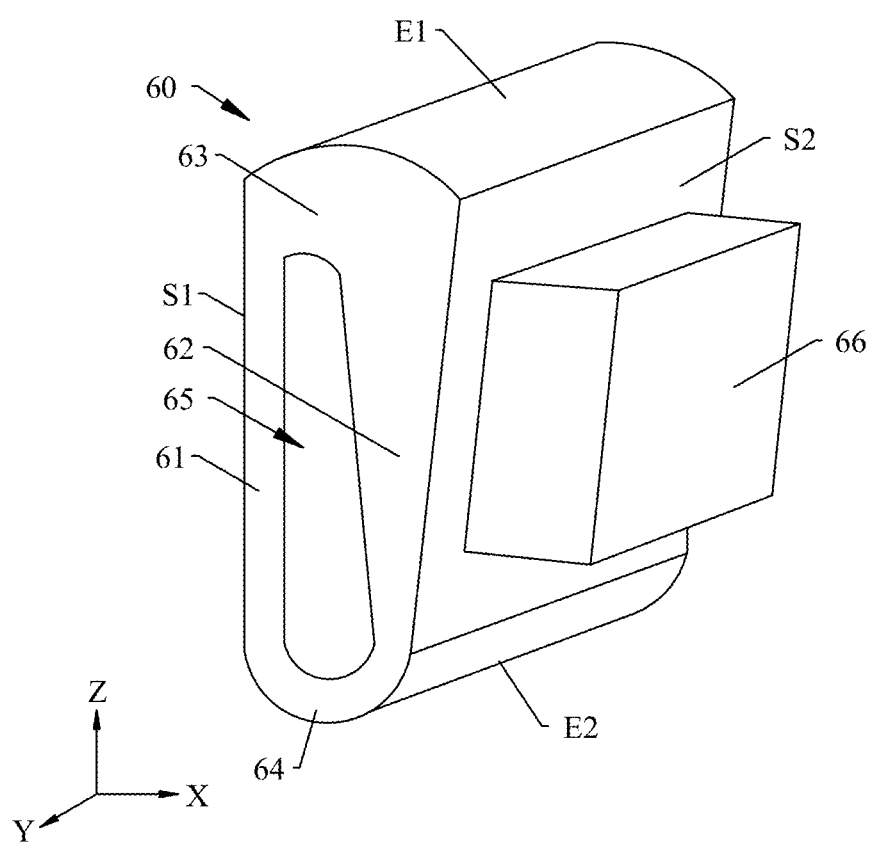
FIG. 13 is a schematic diagram of a structure obtained after the first positioning member shown in FIG. 11 is squeezed by a camera body.

In this way, a width of the accommodating space 65 gradually increases in the direction pointing from the third sidewall 63 to the fourth sidewall 64, so that the compressible capability of the first positioning member body in the first positioning member 60 gradually increases from the first end E1 to the second end E2 in the direction perpendicular to the first side surface 43. FIG. 12 is a schematic diagram of a structure obtained after the first positioning member 60 shown in FIG. 10 is squeezed by the camera body 51, and FIG. 13 is a schematic diagram of a structure obtained after the first positioning member 60 shown in FIG. 11 is squeezed by the camera body 51. This structure is simple and easy to implement.

Figure 14:
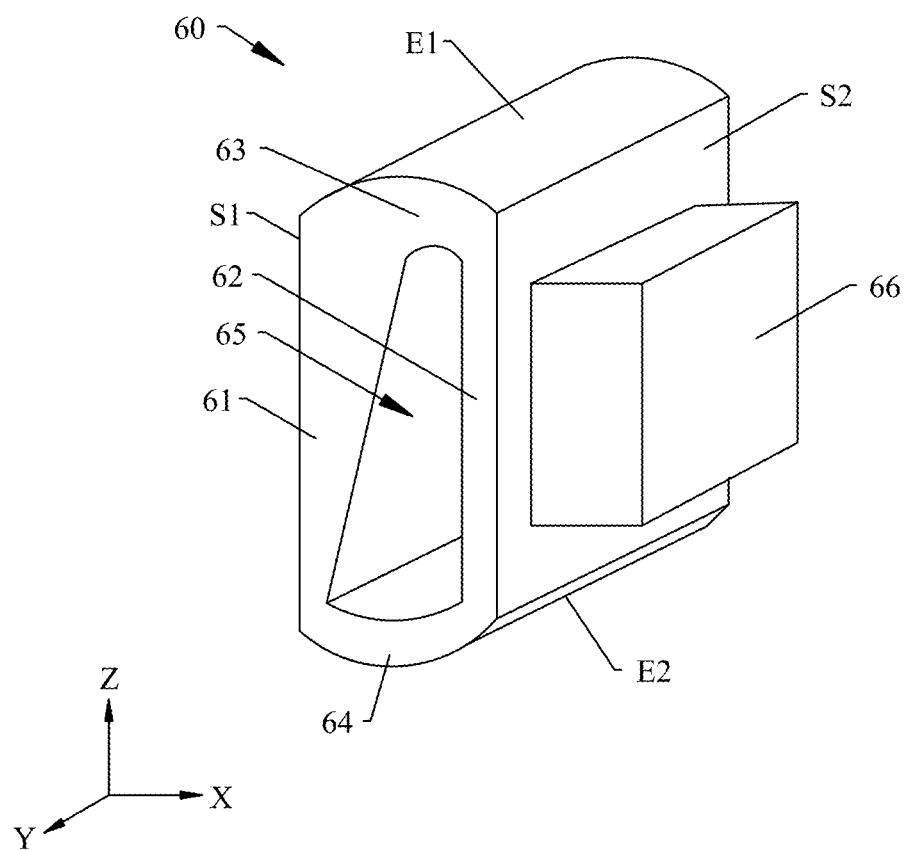
FIG. 14 is a three-dimensional diagram of a first positioning member according to some other embodiments of this application.

Second implementation: FIG. 14 is a three-dimensional diagram of the first positioning member 60 according to some other embodiments of this application. In this implementation, a wall thickness of the first sidewall 61 gradually decreases in a direction pointing from the third sidewall 63 to the fourth sidewall 64, namely, a –Z-axis direction. A reduction manner also includes at least one of continuous reduction and stepwise reduction. FIG. 14 shows an example in which the wall thickness of the first sidewall 61 is reduced continuously.

Figure 15:
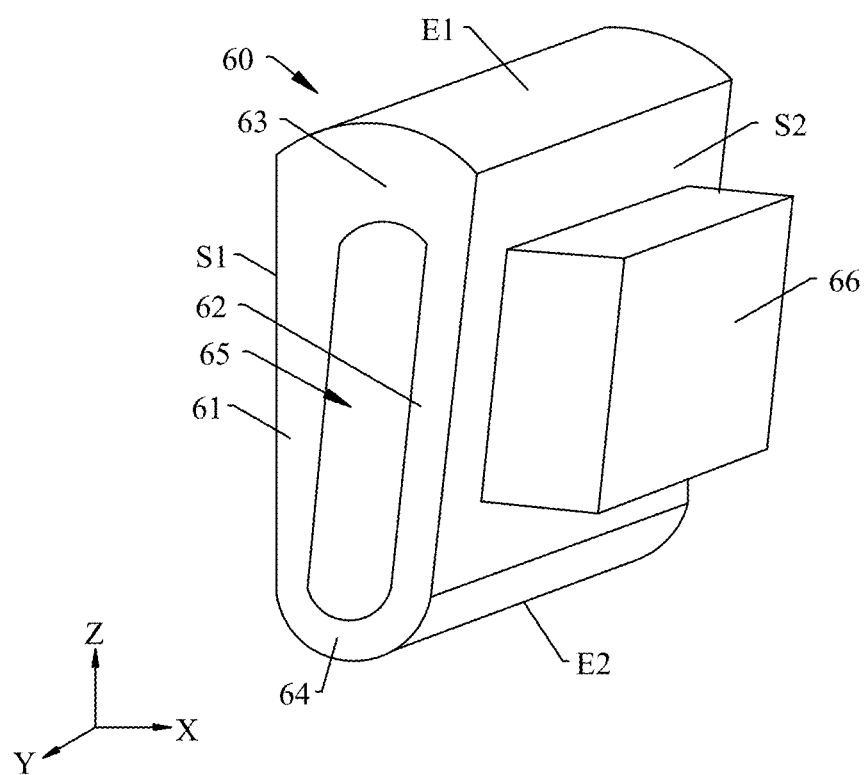
FIG. 15 is a schematic diagram of a structure obtained after the first positioning member shown in FIG. 14 is squeezed by a camera body.

In this way, a width of the accommodating space 65 also gradually increases in the direction pointing from the third sidewall 63 to the fourth sidewall 64, so that the compressible capability of the first positioning member body gradually increases from the first end E1 to the second end E2 in the direction perpendicular to the first side surface 43. FIG. 15 is a schematic diagram of a structure obtained after the first positioning member 60 shown in FIG. 14 is squeezed by the camera body 51. This structure is simple and easy to implement.

Figure 16:
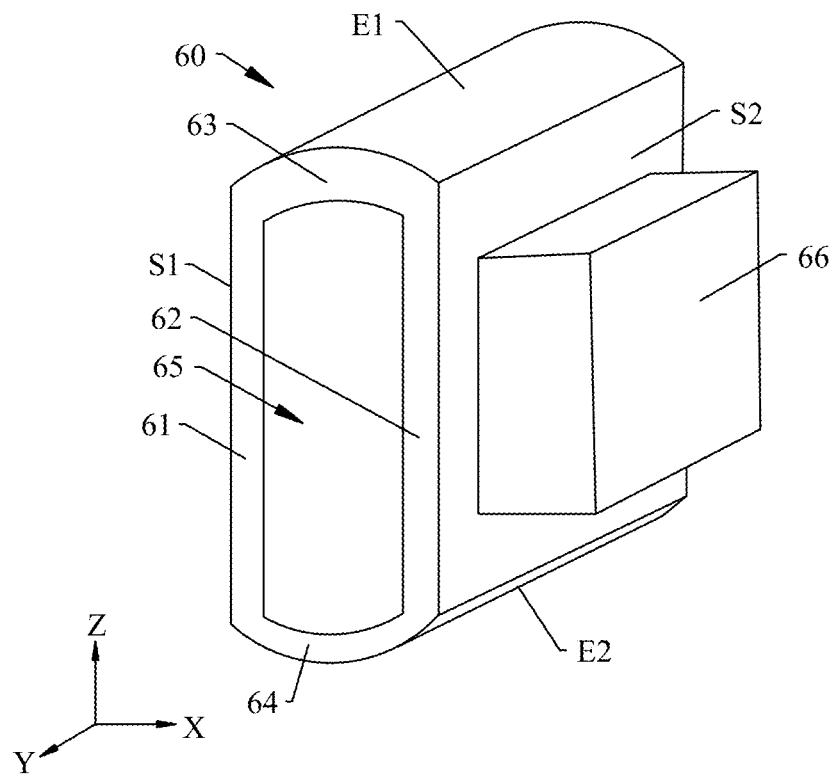
FIG. 16 is a three-dimensional diagram of a first positioning member according to some other embodiments of this application.

Third implementation: FIG. 16 is a three-dimensional diagram of the first positioning member 60 according to some other embodiments of this application. In this implementation, in the first positioning member body, a thickness of the third sidewall 63 is greater than a thickness of the fourth sidewall 64.

In this way, on a premise that the materials of the third sidewall 63 and the fourth sidewall 64 are the same, the fourth sidewall 64 is more elastic and is more easily bent compared with the third sidewall 63, so that the compressible capability of the first positioning member body gradually increases from the first end E1 to the second end E2 in the direction perpendicular to the first side surface 43. This structure is simple and easy to implement.

Figure 17:
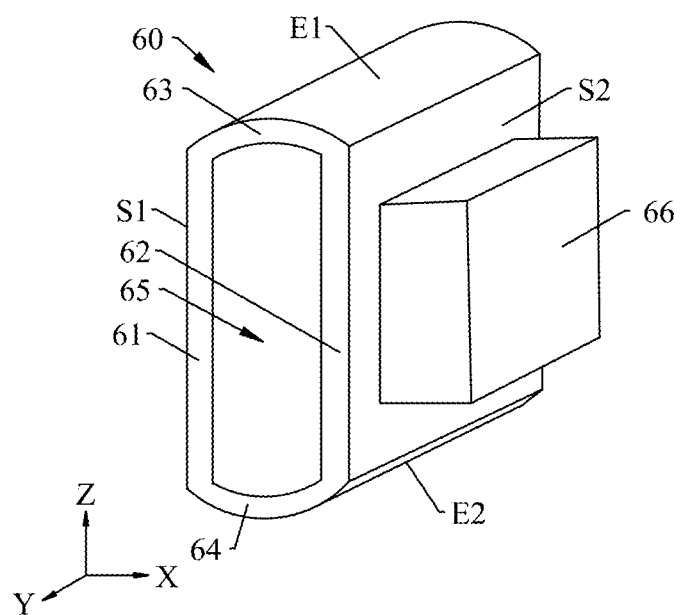
FIG. 17 is a three-dimensional diagram of a first positioning member according to some other embodiments of this application.

Fourth implementation: FIG. 17 is a three-dimensional diagram of the first positioning member 60 according to some other embodiments of this application. In this implementation, an elastic modulus of the material of the third sidewall 63 is greater than an elastic modulus of the material of the fourth sidewall 64.

In this way, on a premise that the thickness of the third sidewall 63 is equal to the thickness of the fourth sidewall 64, the fourth sidewall 64 is more elastic and is more easily bent compared with the third sidewall 63, so that the compressible capability of the first positioning member body gradually increases from the first end E1 to the second end E2 in the direction perpendicular to the first side surface 43. This structure is simple and easy to implement.

Figure 18:
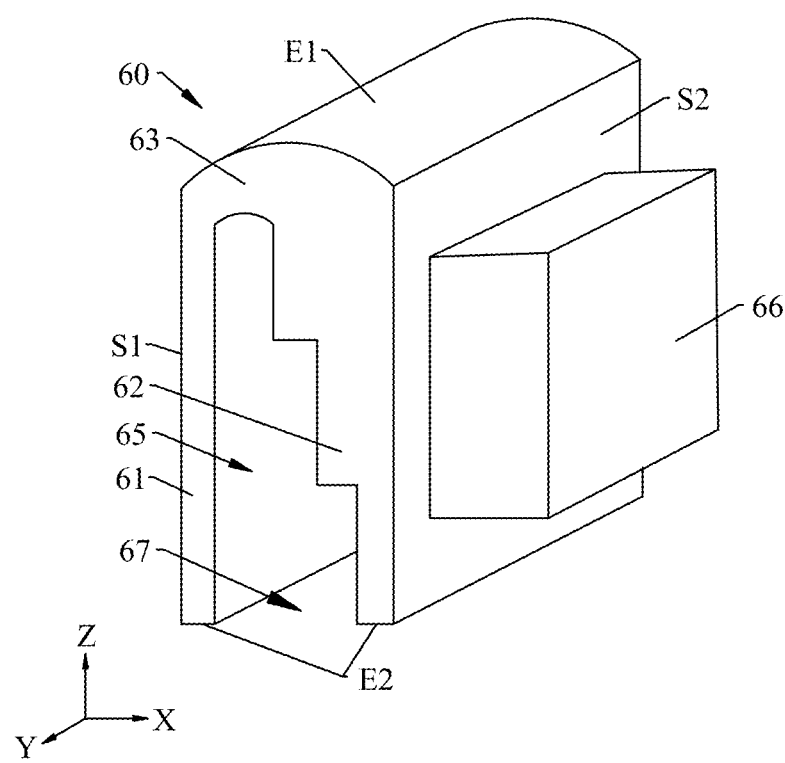
FIG. 18 is a three-dimensional diagram of a first positioning member according to some other embodiments of this application.

Embodiment 3: FIG. 18 is a three-dimensional diagram of the first positioning member 60 according to some other embodiments of this application. In this embodiment, the first positioning member body in the first positioning member 60 includes: a first sidewall 61 and a second sidewall 62 that are disposed opposite to and spaced from each other, and a third sidewall 63 connected between the first sidewall 61 and the second sidewall 62.

A surface that is of the first sidewall 61 and that faces away from the second sidewall 62 forms the fastening surface S1. When the first positioning member 60 is mounted between the first side surface 43 of the bracket 40 and the camera body 51, the fastening surface S1 faces the first side surface 43. The fastening surface S1 is disposed on the first side surface 43. The second sidewall 62 is located between the first sidewall 61 and the camera body 51.

The third sidewall 63 forms the first end E1 of the first positioning member body, and at least the third sidewall 63 includes an elastic-plastic material. The elastic-plastic material includes but is not limited to at least one of plastic, silicone, and spring steel. The first sidewall 61, the second sidewall 62, and the third sidewall 63 enclose an accommodating space 65, and an opening 67 is formed at an end that is of the accommodating space 65 and that is away from the third sidewall 63. Parts that are of the first sidewall 61 and the second sidewall 62 and that enclose the opening 67 form the second end E2.

In this way, a compressible capability of the second end E2 is larger compared with the first end E1, so that the compressible capability of the first positioning member body gradually increases from the first end E1 to the second end E2 in the direction perpendicular to the first side surface 43. This structure is simple with fewer materials. Therefore, costs are low.

Materials of the first sidewall 61, the second sidewall 62, and the third sidewall 63 may be the same, that is, the first sidewall 61, the second sidewall 62, and the third sidewall 63 each include an elastic-plastic material, for example, each are made of plastic, and are formed integrally. In this way, forming difficulty and composition structure complexity of the first positioning member body can be reduced.

Based on the foregoing embodiment, a wall thickness of the second sidewall 62 and/or the first sidewall 61 may also gradually decrease in a direction pointing from the third sidewall 63 to the opening 67, namely, a −Z-axis direction, thereby increasing a difference between the compressible capability of the first end E1 and the compressible capability of the second end E2. A reduction manner also includes at least one of continuous reduction and stepwise reduction. In the embodiment shown in FIG. 18, a thickness of the second sidewall 62 decreases stepwise in the −Z-axis direction.

The foregoing describes three embodiments of the first positioning member body. In the foregoing Embodiment 2 and Embodiment 3, the first positioning member body has the accommodating space 65, and the accommodating space 65 may be filled with air, or may be filled with a soft elastic material. The soft elastic material includes but is not limited to silicone, rubber, foam, and sponge. It should be noted that when the accommodating space 65 of the first positioning member 60 is filled with a soft elastic material, it should be ensured that an elastic modulus of the soft elastic material is less than the elastic modulus of the material of each of the third sidewall 63 and the fourth sidewall 64. In this way, elasticity of the soft elastic material is greater than elasticity of the material of each of the third sidewall 63 and the fourth sidewall 64, and interference with a layout form for a size of a compressible capability of the foregoing housing structure can be avoided.

Figure 19:
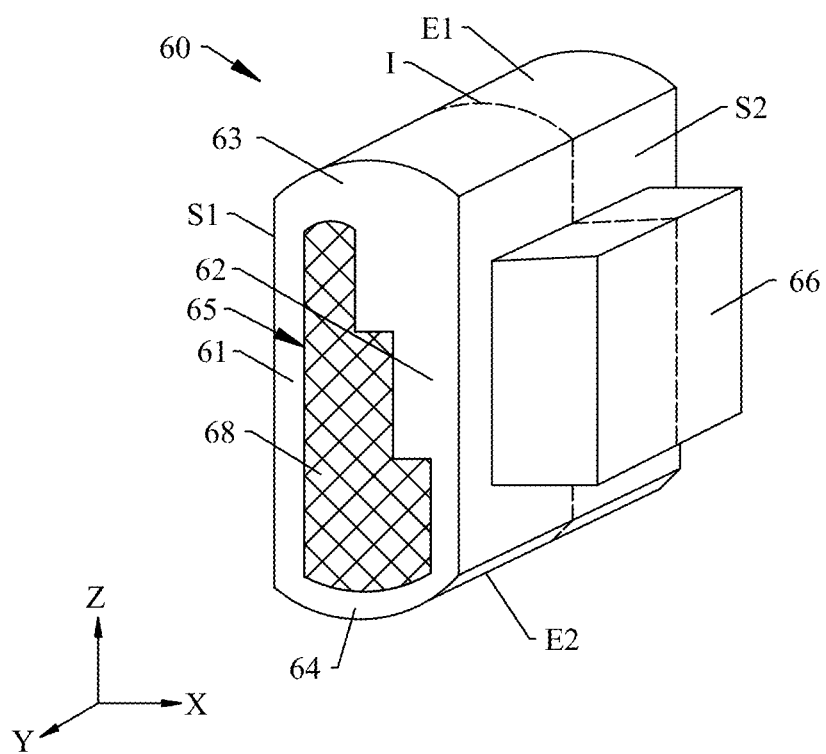
FIG. 19 is a three-dimensional diagram of a first positioning member according to some other embodiments of this application.
Figure 20:
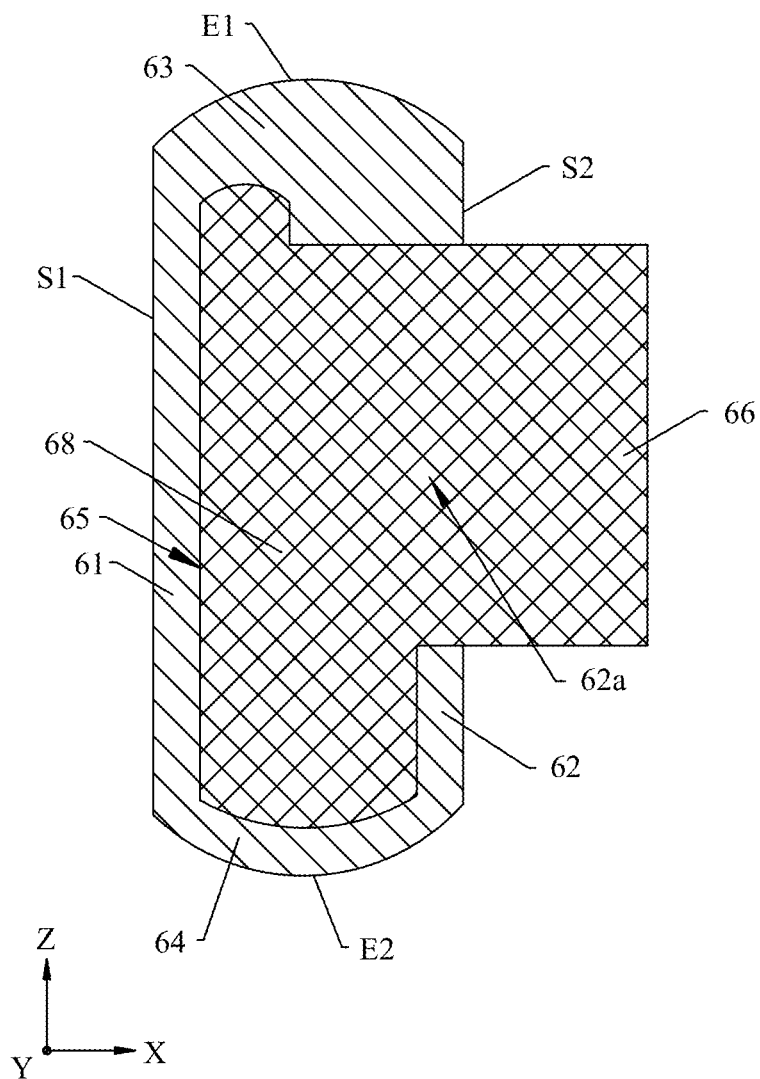
FIG. 20 is a schematic diagram of a cross-sectional structure of the first positioning member shown in FIG. 19 in a plane I.

For example, FIG. 19 is a three-dimensional diagram of the first positioning member 60 according to some other embodiments of this application, and FIG. 20 is a schematic diagram of a cross-sectional structure of the first positioning member 60 shown in FIG. 19 in a plane I. Compared with the first positioning member 60 shown in FIG. 10, in this embodiment, the accommodating space 65 is filled with a soft elastic material 68. The soft elastic material 68 may be rubber. In this way, structural stability of the first positioning member 60 can be improved.

In the foregoing Embodiment 1, Embodiment 2, and Embodiment 3, a surface that is of the first positioning member body and that faces away from the fastening surface S1 is defined as a support surface S2 with reference to FIG. 8-FIG. 20. When the first positioning member 60 is mounted between the first side surface 43 of the bracket 40 and the camera body 51, the support surface S2 faces the camera body 51. In some embodiments, when the first positioning member body is in a free state, the support surface S2 is also a plane, and the support surface S2 is approximately parallel and opposite to the fastening surface S1. The free state is a state in which the first positioning member body is not subjected to any external force (for example, a compression force of the camera). In this way, the first positioning member body has a regular shape, thereby facilitating positioning. In some other embodiments, the support surface S2 may alternatively tilt at a specific angle relative to the fastening surface S1, or the support surface S2 is a curved surface, for example, an arc surface. This is not specifically limited herein. In this embodiment of this application, an example in which the support surface S2 is a plane, and the support surface S2 is approximately parallel and opposite to the fastening surface S1 is used for description. This cannot be considered as a special limitation on this application. When the first positioning member 60 is applied to the electronic device 100, and the first positioning member body in the first positioning member 60 is in a compressed state due to being squeezed by the camera body 51, the support surface S2 is a tilted surface that tilts close to the fastening surface S1 in a direction pointing from the first end E1 to the second end E2.

With reference to any one of Embodiment 1 to Embodiment 3, optionally, the first positioning member 60 further includes a first contact member 66. The first contact member 66 is disposed on the support surface S2, and the first contact member 66 is configured to contact the camera body 51. Based on this, to avoid scraping the camera body 51 by the first contact member 66, in some embodiments, the first contact member 66 may be made of an elastic material, for example, silicone or rubber.

Refer to FIG. 20. Based on the foregoing embodiment, optionally, the first contact member 66 is formed integrally with the soft elastic material 68 in the accommodating space 65. Specifically, a notch 62a is disposed on the second sidewall 62, the notch 62a is filled with a soft elastic material, and the soft elastic material in the notch 62a is connected between the first contact member 66 and the soft elastic material 68, and is formed integrally with the first contact member 66 and the soft elastic material 68. This structure is simple without a fastening operation, and is easily assembled. In some other embodiments, the first contact member 66 may alternatively be made of a rigid material.

Figure 21:
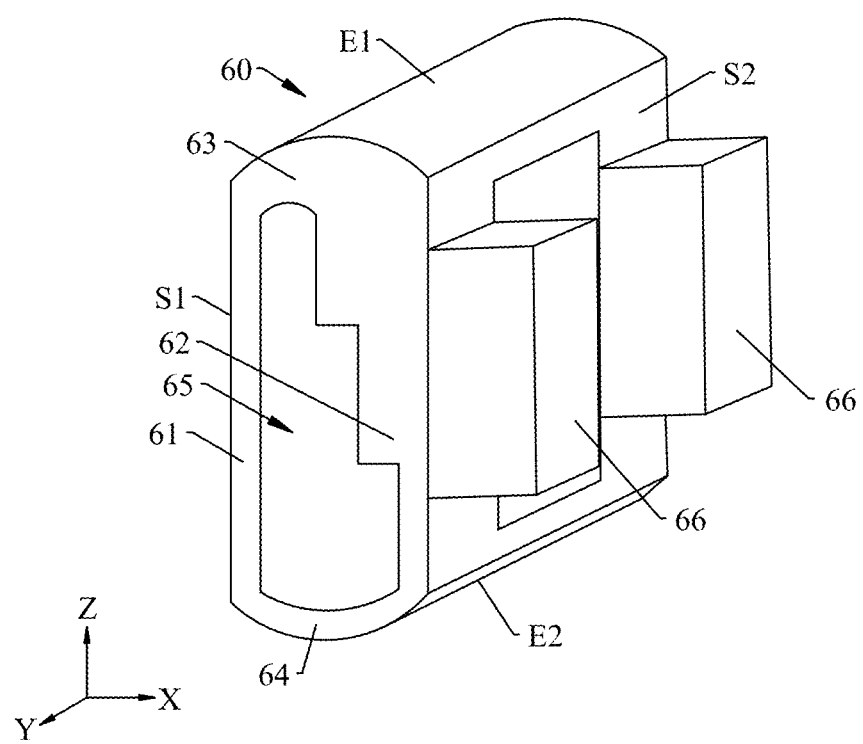
FIG. 21 is a three-dimensional diagram of a first positioning member according to some other embodiments of this application.

There may be one or more first contact members 66. In any accompanying drawing of FIG. 10-FIG. 20, there is one first contact member 66. In some other embodiments, FIG. 21 is a three-dimensional diagram of the first positioning member 60 according to some other embodiments of this application. In this embodiment, there are two first contact members 66, and the two first contact members 66 are arranged and spaced from each other in the Y-axis direction. In this way, a support force applied to the camera body 51 by the first contact member 66 can be more balanced.

The first contact member 66 is not limited by a material of the first positioning member body, and may be made of a suitable material based on a requirement, to ensure support performance for the camera body 51. In some other embodiments, the first contact member 66 may alternatively not be disposed in the first positioning member 60.

Figure 22:
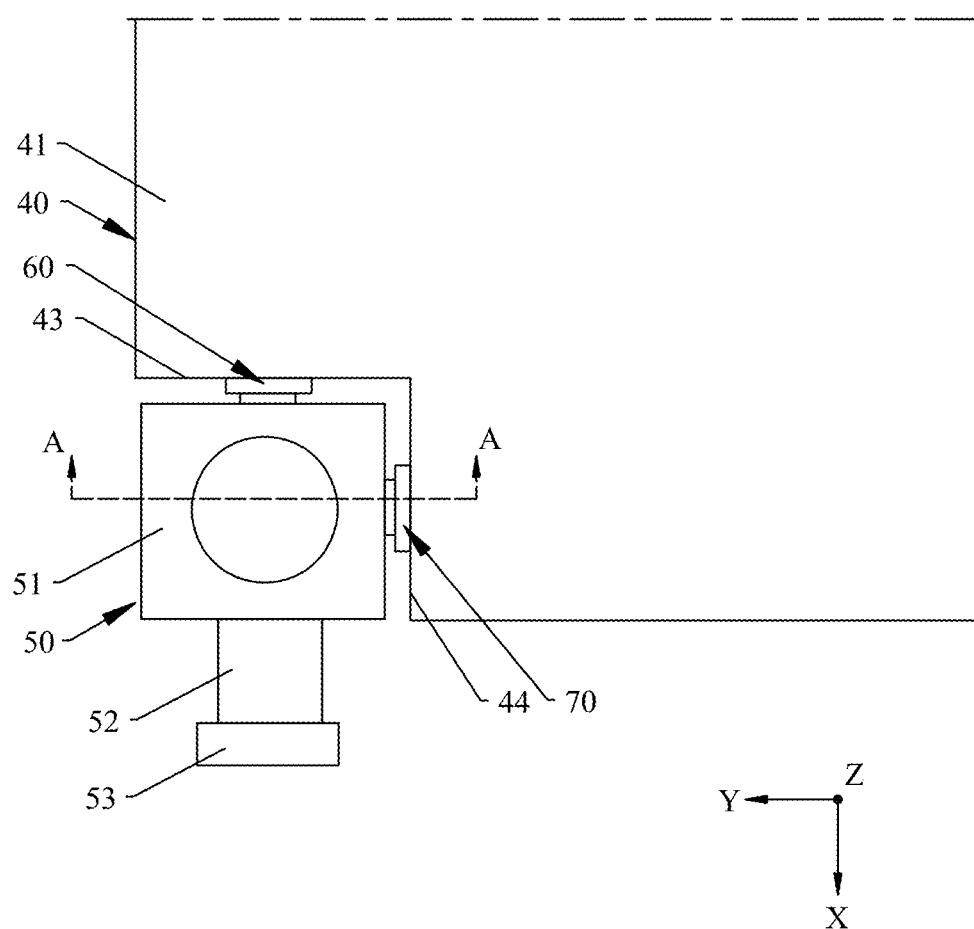
FIG. 22 is a top view of an assembled structure of a circuit board bracket and a camera according to some other embodiments of this application.
Figure 23:
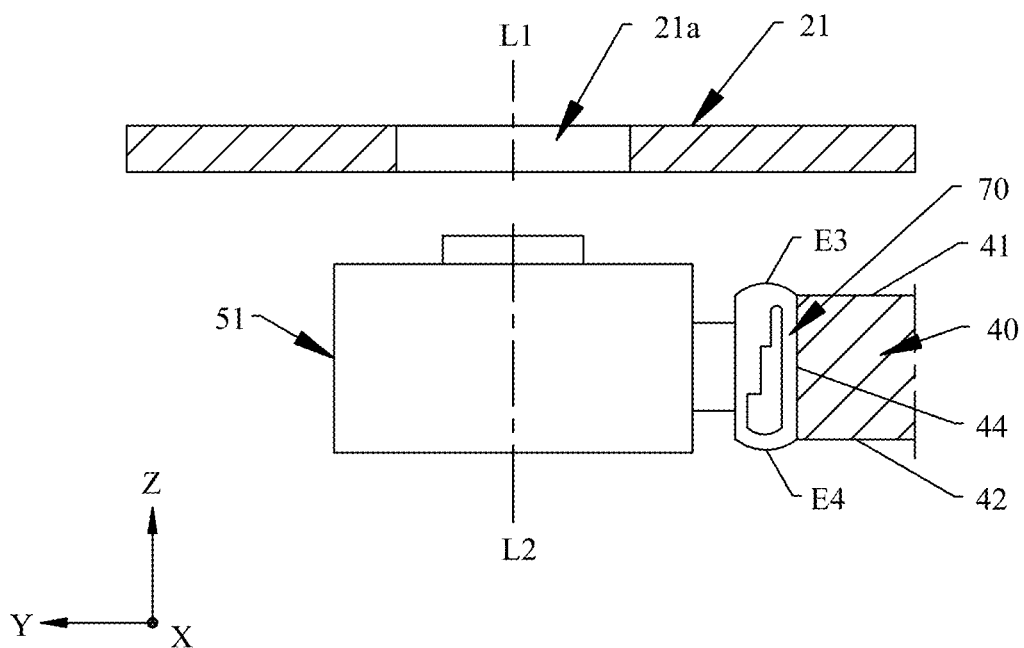
FIG. 23 is a schematic diagram of a position of a cross-sectional structure at a line A-A of the assembled structure shown in FIG. 22 relative to a back cover.

The foregoing embodiments describe a manner in which the camera body 51 is limited on one side of the camera body 51 in the XY plane by using the bracket 40. In some other embodiments, FIG. 22 is a top view of an assembled structure of the bracket 40 and the camera 50 according to some other embodiments of this application; and FIG. 23 is a schematic diagram of a position of a cross-sectional structure at a line A-A of the assembled structure shown in FIG. 22 relative to the back cover 21. In this embodiment, the bracket 40 further includes a second side surface 44. The second side surface 44 is connected between the first surface 41 and the second surface 42, and the second side surface 44 is connected to the first side surface 43. The camera body 51 is further located on a side that the second side surface 44 faces.

Based on this, the electronic device 100 further includes a second positioning member 70. The second positioning member 70 is located between the second side surface 44 and the camera body 51, and the second positioning member 70 includes a second positioning member body. The second positioning member body is disposed on the second side surface 44. An end that is of the second positioning member body and that faces the back cover 21 is defined as a third end E3, and an end that is of the second positioning member body and that faces away from the back cover 21 is defined as a fourth end E4. A compressible capability of the second positioning member body gradually increases from the third end E3 to the fourth end E4 in a direction perpendicular to the second side surface 44.

A specific structural form of the second positioning member body may be the same as the structural form of the foregoing first positioning member body. Details are not described herein again.

In this way, the camera body 51 is limited on still another side in the XY plane by using the second side surface 44 of the bracket 40. This can improve accuracy of limiting the camera body 51. In addition, the second positioning member 70 is used to reduce a deviation that is between the center of the light-incident surface of the camera body 51 and the center of the light-transmitting window 21*a* on the back cover 21 and that occurs when the position of the camera body 51 deviates close to the second side surface 44, to ensure the appearance fineness of the electronic device 100.

In some embodiments, the second positioning member 70 further includes a second contact member, and the second contact member is disposed on a surface that is of the second positioning member body and that faces away from the second side surface 44. A specific structural form of the second contact member may also be the same as the structural form of the foregoing first contact member. Details are not described herein again.

Figure 24:
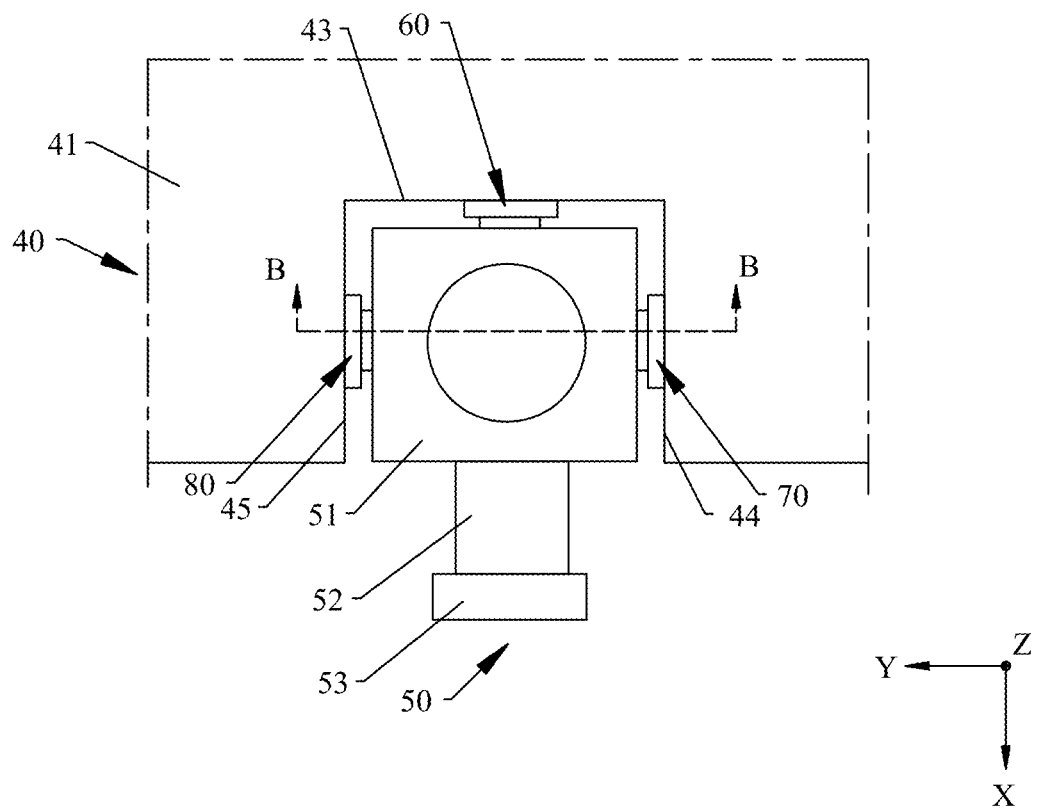
FIG. 24 is a top view of an assembled structure of a circuit board bracket and a camera according to some other embodiments of this application.
Figure 25:
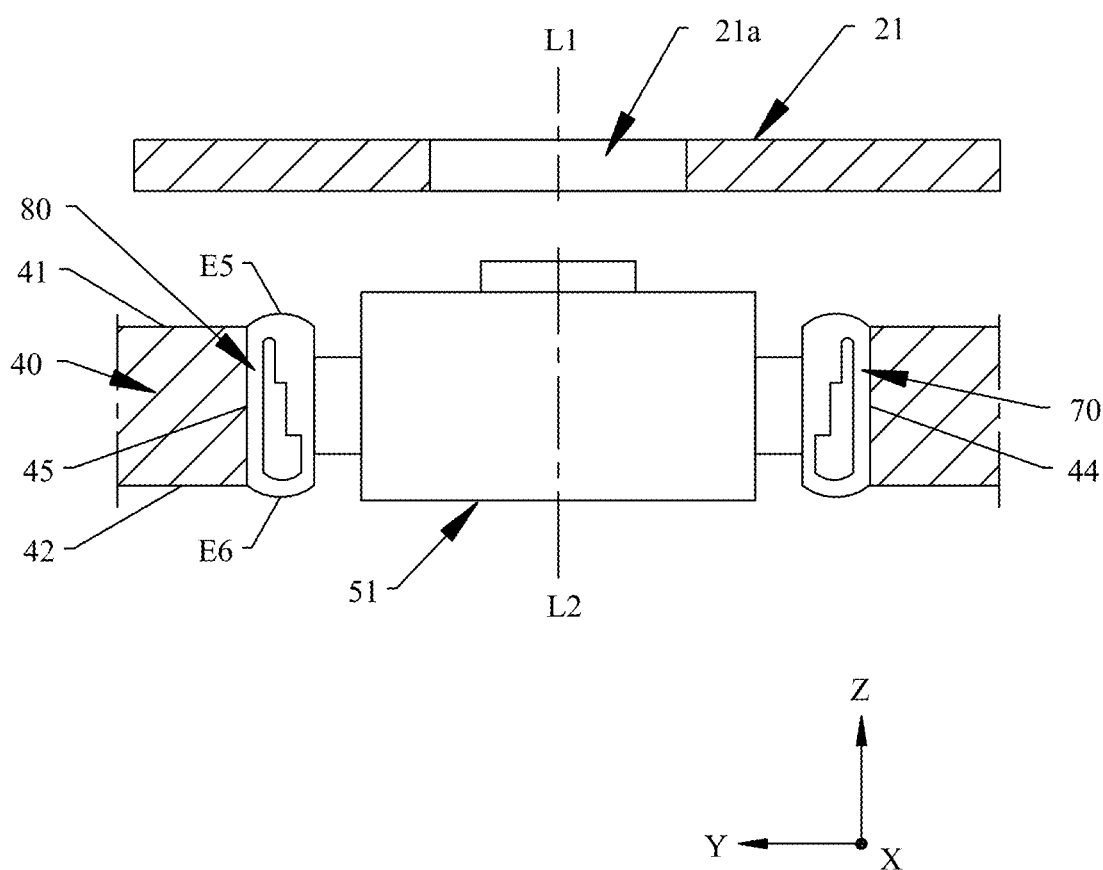
FIG. 25 is a schematic diagram of a position of a cross-sectional structure at a line B-B of the assembled structure shown in FIG. 24 relative to a back cover.

In some other embodiments, FIG. 24 is a top view of an assembled structure of the bracket 40 and the camera 50 according to some other embodiments of this application; and FIG. 25 is a schematic diagram of a position of a cross-sectional structure at a line B-B of the assembled structure shown in FIG. 24 relative to the back cover 21. In this embodiment, the bracket 40 further includes a third side surface 45. The second side surface 45 is also connected between the first surface 41 and the second surface 42, and the third side surface 45 is connected to an end that is of the first side surface 43 and that is away from the second side surface 44. The camera body 51 is further located on a side that the third side surface 45 faces.

Based on this, the electronic device 100 further includes a third positioning member 80. The third positioning member 80 is located between the third side surface 45 and the camera body 51, and the third positioning member 80 includes a third positioning member body. The third positioning member body is disposed on the third side surface 45. An end that is of the third positioning member body and that faces the back cover 21 is defined as a fifth end E5, and an end that is of the third positioning member body and that faces away from the back cover 21 is defined as a sixth end E6. A compressible capability of the third positioning member body gradually increases from the fifth end E5 to the sixth end E6 in a direction perpendicular to the third side surface 45.

A specific structural form of the third positioning member body may be the same as the structural form of the foregoing first positioning member body. Details are not described herein again.

In this way, the camera body 51 is limited on still another side in the XY plane by using the third side surface 45 of the bracket 40. This can improve accuracy of limiting the camera body 51. In addition, the third positioning member 80 is used to reduce a deviation that is between the center of the light-incident surface of the camera body 51 and the center of the light-transmitting window 21*a* on the back cover 21 and that occurs when the position of the camera body 51 deviates close to the third side surface 45, to ensure the appearance fineness of the electronic device 100.

In some embodiments, the third positioning member 80 further includes a third contact member, and the third contact member is disposed on a surface that is of the third positioning member body and that faces away from the third side surface 45. A specific structural form of the third contact member may also be the same as the structural form of the foregoing first contact member. Details are not described herein again.

Figure 26:
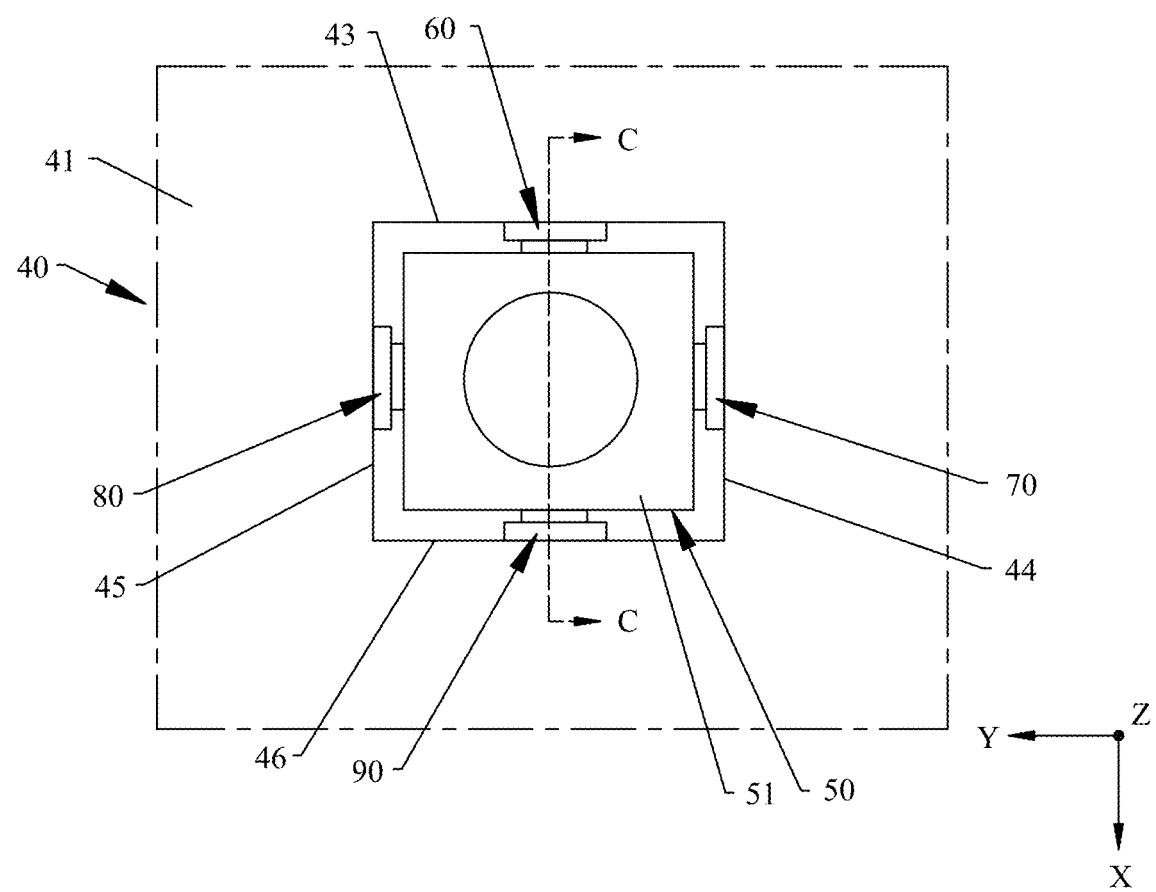
FIG. 26 is a top view of an assembled structure of a circuit board bracket and a camera according to some other embodiments of this application.
Figure 27:
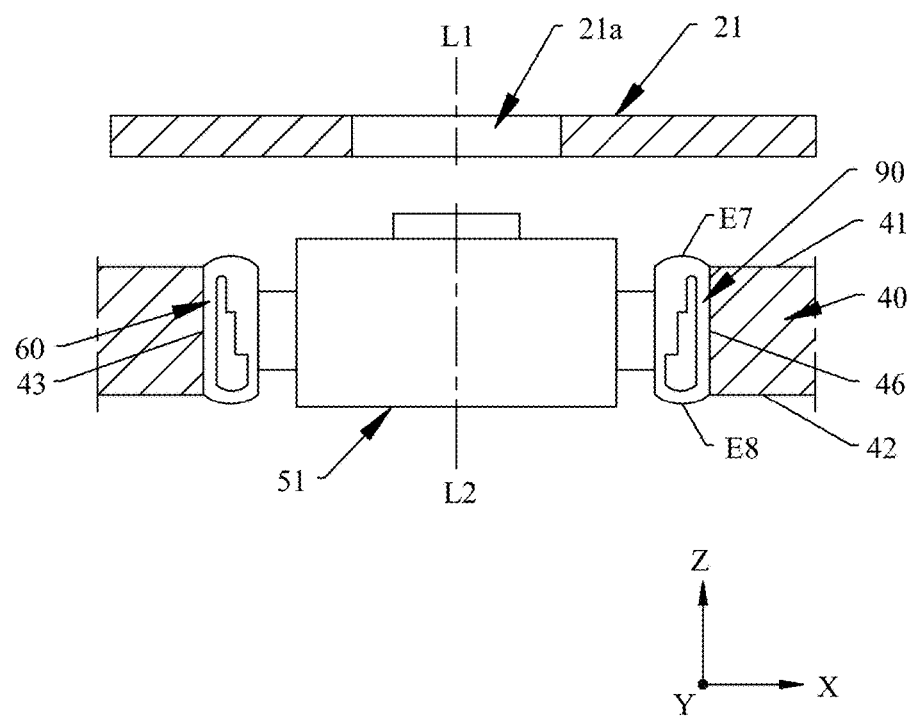
FIG. 27 is a schematic diagram of a position of a cross-sectional structure at a line C-C of the assembled structure shown in FIG. 26 relative to a back cover.

In some other embodiments, FIG. 26 is a top view of an assembled structure of the bracket 40 and the camera 50 according to some other embodiments of this application; and FIG. 27 is a schematic diagram of a position of a cross-sectional structure at a line C-C of the assembled structure shown in FIG. 26 relative to the back cover 21. In this embodiment, the bracket 40 further includes a fourth side surface 46. The fourth side surface 46 is connected between the first surface 41 and the second surface 42, and the fourth side surface 46 is opposite to the first side surface 43. The camera body 51 is further located on a side that the fourth side surface 46 faces.

Based on this, the electronic device 100 further includes a fourth positioning member 90. The fourth positioning member 90 is located between the fourth side surface 46 and the camera body 51, and the fourth positioning member 90 includes a fourth positioning member body. The fourth positioning member body is disposed on the fourth side surface 46. An end that is of the fourth positioning member body and that faces the back cover 21 is defined as a seventh end E7, and an end that is of the fourth positioning member body and that faces away from the back cover 21 is defined as an eighth end E8. A compressible capability of the fourth positioning member body gradually increases from the seventh end E7 to the eighth end E8 in a direction perpendicular to the fourth side surface 46.

A specific structural form of the fourth positioning member body may be the same as the structural form of the foregoing first positioning member body. Details are not described herein again.

In this way, the camera body 51 is limited on still another side in the XY plane by using the fourth side surface 46 of the bracket 40. This can improve accuracy of limiting the camera body 51. In addition, the fourth positioning member 90 is used to reduce a deviation that is between the center of the light-incident surface of the camera body 51 and the center of the light-transmitting window 21*a* on the back cover 21 and that occurs when the position of the camera body 51 deviates close to the fourth side surface 46, to ensure the appearance fineness of the electronic device 100.

In some embodiments, the fourth positioning member 90 further includes a fourth contact member, and the fourth contact member is disposed on a surface that is of the fourth positioning member body and that faces away from the fourth side surface 46. A specific structural form of the fourth contact member may also be the same as the structural form of the foregoing first contact member. Details are not described herein again.

Figure 28:
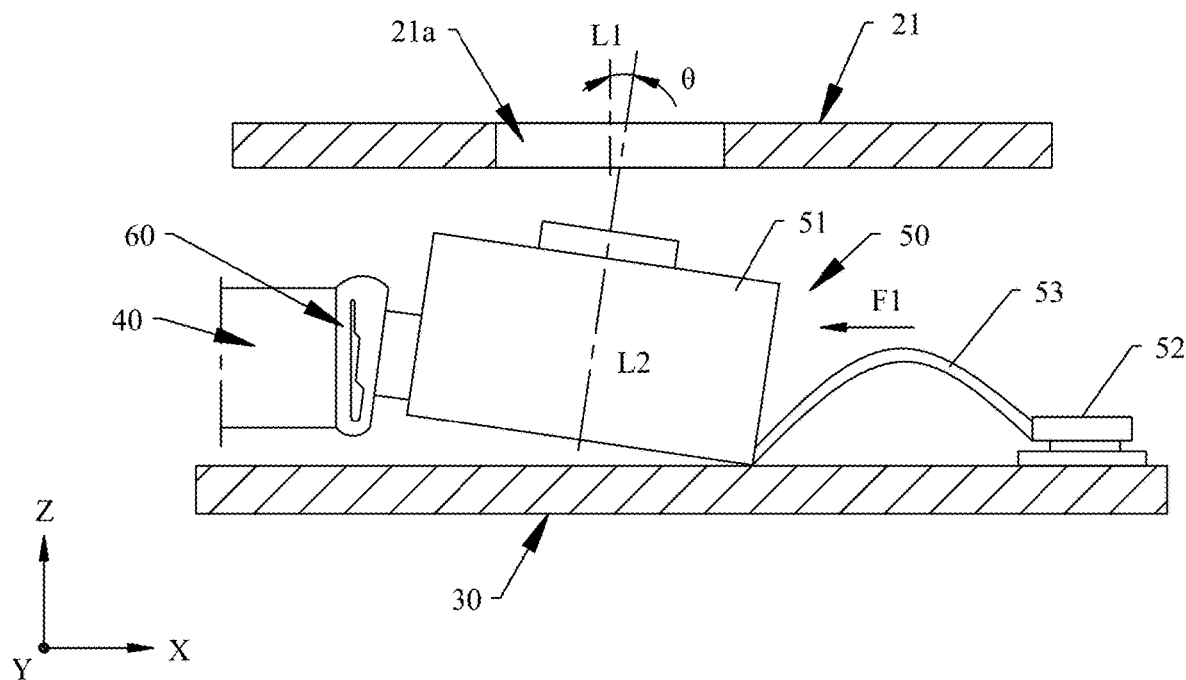
FIG. 28 is a diagram of assembly of a back cover, a circuit board, a circuit board bracket, and a camera in an electronic device according to some embodiments of this application.

The foregoing describes a plurality of manners of limiting the camera body 51 by using the bracket 40. In the embodiment shown in FIG. 26, the camera body 51 is limited in a circumference of the camera body 51 in the XY plane by using the bracket 40. In addition, with reference to Z-axis limiting of the circuit board 30 and the back cover 21, the position of the camera body 51 in the electronic device 100 can be fixed. In the embodiments shown in FIG. 4, FIG. 22, and FIG. 24, the position of the camera body 51 in the electronic device 100 cannot be fixed by using the bracket 40. Based on this, in some embodiments, FIG. 28 is a diagram of assembly of the back cover 21, the circuit board 30, the bracket 40, and the camera 50 in the electronic device 100 according to some embodiments of this application. In this embodiment, the electrical connection terminal 52 of the camera 50 is located on a side that is of the camera body 51 and that faces away from the first positioning member 60, and the electrical connection terminal 52 is fixedly and electrically connected to the circuit board 30. The flexible electrical connection structure 53 is connected between the camera body 51 and the electrical connection terminal 52. The flexible electrical connection structure 53 has a redundant length, so that the flexible electrical connection structure 53 is in a bent state. The flexible electrical connection structure 53 in the bent state may apply, to the camera body 51, an elastic force F1 pointing to the first positioning member 60. The elastic force F1 may be a resultant force applied to the camera body 51 by the flexible electrical connection structure 53, or may be one of component forces of the resultant force. Therefore, the first positioning member 60 and the flexible electrical connection structure 53 are used to clamp and fasten the camera body 51, so that the position of the camera body 51 in the XY plane is fixed. In this positioning manner, a positioning structure does not need to be added. Therefore, the electronic device 100 has a simple composition structure, low costs, and high assembly efficiency.

Still refer to FIG. 28. In the foregoing embodiment, the first positioning member 60 is in a compressed state, and the camera body 51 is in a tilted state. A tilt angle of the camera body 51 relative to the back cover 21 is θ, and θ is an included angle between the central axis L1 of the light-transmitting window 21a and the central axis L2 of the light-incident surface of the camera body 51. In some embodiments, θ may be less than or equal to 5°. Based on this, optionally, θ may be further greater than or equal to 0.05°.

In the foregoing embodiment, the flexible electrical connection structure 53 is used as a force-applying structure of the elastic force F1. In addition to the flexible electrical connection structure 53, the force-applying structure may alternatively be a structural part, for example, a spring, silicone, or rubber. This is not specifically limited herein.

In addition, in the foregoing embodiment, the force-applying structure may also apply, to the camera body 51, an elastic force pointing to the second positioning member 70, the third positioning member 80, or the fourth positioning member 90, to fix the position of the camera body 51. Details are not described herein again.

In the descriptions of this specification, specific features, structures, materials, or characteristics may be combined in any one or more embodiments or examples in a suitable manner.

Finally, it should be noted that the foregoing embodiments are only used to describe the technical solutions of this application, but are not used to limit this application. Although this application is described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. An electronic device, comprising:
a housing, having a first wall plate, wherein the first wall plate comprises a light-transmitting window;
a bracket, disposed in the housing, wherein a surface that is of the bracket and that faces the first wall plate is a first surface, a surface that is of the bracket and that faces away from the first wall plate is a second surface, the bracket further comprises a first side surface, and the first side surface is connected between the first surface and the second surface;
a camera, disposed in the housing, wherein the camera comprises a camera body, the camera body is located on a side that the first side surface faces, and a light-incident surface of the camera body faces the light-transmitting window; and
a first positioning member, located between the first side surface and the camera body, wherein the first positioning member comprises a first positioning member body, the first positioning member body is disposed on the first side surface, an end that is of the first positioning member body and that faces the first wall plate is a first end, an end that is of the first positioning member body and that faces away from the first wall plate is a second end, and a compressible capability of the first positioning member body gradually increases from the first end to the second end in a direction perpendicular to the first side surface.

2. The electronic device according to claim 1, wherein the first positioning member body comprises: a first sidewall and a second sidewall that are disposed opposite to and spaced from each other, and a third sidewall and a fourth sidewall that are disposed opposite to and spaced from each other;
the first sidewall is located between the first side surface and the second sidewall, and the second sidewall is located between the first sidewall and the camera body;
the third sidewall is connected between the first sidewall and the second sidewall, the third sidewall forms the first end, the fourth sidewall is connected between the first sidewall and the second sidewall, and the fourth sidewall forms the second end; and
the first sidewall, the second sidewall, the third sidewall, and the fourth sidewall enclose an accommodating space, and at least the third sidewall and the fourth sidewall each comprise an elastic-plastic material.

3. The electronic device according to claim 2, wherein the first sidewall, the second sidewall, the third sidewall, and the fourth sidewall are integrally formed; and
a thickness of the third sidewall is greater than a thickness of the fourth sidewall.

4. The electronic device according to claim 2, wherein a wall thickness of the second sidewall gradually decreases in a direction pointing from the third sidewall to the fourth sidewall.

5. The electronic device according to claim 4, wherein the wall thickness of the second sidewall decreases continuously or stepwise in the direction pointing from the third sidewall to the fourth sidewall.

6. The electronic device according to claim 2, wherein a wall thickness of the first sidewall gradually decreases in a direction pointing from the third sidewall to the fourth sidewall; and
the accommodating space is filled with a soft elastic material, and an elastic modulus of the soft elastic material is less than an elastic modulus of the material of each of the third sidewall and the fourth sidewall.

7. The electronic device according to claim 1, wherein the first positioning member body comprises: a first sidewall and a second sidewall that are disposed opposite to and spaced from each other, and a third sidewall connected between the first sidewall and the second sidewall;
   the first sidewall is located between the first side surface and the second sidewall, and the second sidewall is located between the first sidewall and the camera body;
   the third sidewall forms the first end, and at least the third sidewall comprises an elastic-plastic material; and
   the first sidewall, the second sidewall, and the third sidewall enclose an accommodating space, an opening is formed at an end that is of the accommodating space and that is away from the third sidewall, and parts that are of the first sidewall and the second sidewall and that enclose the opening form the second end.

8. The electronic device according to claim 7, wherein a surface that is of the first positioning member body and that faces the first side surface is a fastening surface, the fastening surface is a plane, and the fastening surface is disposed on the first side surface;
   a surface that is of the first positioning member body and that faces away from the first side surface is a support surface, and the support surface faces the camera body; and
   the first positioning member body is in a free state, and the support surface is a plane parallel to the fastening surface and opposite to the fastening surface; or the first positioning member body is in a compressed state due to being squeezed by the camera body, and the support surface is a tilted surface that tilts close to the fastening surface in a direction pointing from the first end to the second end.

9. The electronic device according to claim 7, further comprising:
   a circuit board, disposed in the housing, wherein the circuit board is located on a side that is of the bracket and that is away from the first wall plate;
   the camera further comprises an electrical connection terminal and a flexible electrical connection structure, the electrical connection terminal is located on a side that is of the camera body and that faces away from the first positioning member, and the electrical connection terminal is fixedly and electrically connected to the circuit board; and
   the flexible electrical connection structure is connected between the camera body and the electrical connection terminal, and the flexible electrical connection structure is in a bent state, to apply, to the camera body, an elastic force pointing to the first positioning member.

10. The electronic device according to claim 7, wherein the bracket further comprises a second side surface, the second side surface is connected between the first surface and the second surface, and the second side surface is connected to the first side surface;
   the camera body is further located on a side that the second side surface faces; and
   the electronic device further comprises:
   a second positioning member, located between the second side surface and the camera body, wherein the second positioning member comprises a second positioning member body, the second positioning member body is disposed on the second side surface, an end that is of the second positioning member body and that faces the first wall plate is a third end, an end that is of the second positioning member body and that faces away from the first wall plate is a fourth end, and a compressible capability of the second positioning member body gradually increases from the third end to the fourth end in a direction perpendicular to the second side surface.

11. The electronic device according to claim 7, wherein the bracket further comprises a fourth side surface, the fourth side surface is connected between the first surface and the second surface, and the fourth side surface is opposite to the first side surface;
   the camera body is further located on a side that the fourth side surface faces; and
   the electronic device further comprises:
   a fourth positioning member, located between the fourth side surface and the camera body, wherein the fourth positioning member comprises a fourth positioning member body, the fourth positioning member body is disposed on the fourth side surface, an end that is of the fourth positioning member body and that faces the first wall plate is a seventh end, an end that is of the fourth positioning member body and that faces away from the first wall plate is an eighth end, and a compressible capability of the fourth positioning member body gradually increases from the seventh end to the eighth end in a direction perpendicular to the fourth side surface.

12. The electronic device according to claim 1, wherein the first positioning member body comprises a plurality of elastic material layers successively stacked from the first end to the second end, and the plurality of elastic material layers are arranged in descending order of elastic moduli.

13. The electronic device according to claim 1, wherein a surface that is of the first positioning member body and that faces the first side surface is a fastening surface, the fastening surface is a plane, and the fastening surface is disposed on the first side surface;
   a surface that is of the first positioning member body and that faces away from the first side surface is a support surface, and the support surface faces the camera body; and
   the first positioning member body is in a free state, and the support surface is a plane parallel to the fastening surface and opposite to the fastening surface; or the first positioning member body is in a compressed state due to being squeezed by the camera body, and the support surface is a tilted surface that tilts close to the fastening surface in a direction pointing from the first end to the second end.

14. The electronic device according to claim 13, wherein the first positioning member further comprises a first contact member, and the first contact member is disposed on the support surface.

15. The electronic device according to claim 1, further comprising:
   a circuit board, disposed in the housing, wherein the circuit board is located on a side that is of the bracket and that is away from the first wall plate;
   the camera further comprises an electrical connection terminal and a flexible electrical connection structure, the electrical connection terminal is located on a side that is of the camera body and that faces away from the first positioning member, and the electrical connection terminal is fixedly and electrically connected to the circuit board; and
   the flexible electrical connection structure is connected between the camera body and the electrical connection terminal, and the flexible electrical connection structure is in a bent state, to apply, to the camera body, an elastic force pointing to the first positioning member.

16. The electronic device according to claim 1, wherein the bracket further comprises a second side surface, the second side surface is connected between the first surface and the second surface, and the second side surface is connected to the first side surface;
- the camera body is further located on a side that the second side surface faces; and
- the electronic device further comprises:
- a second positioning member, located between the second side surface and the camera body, wherein the second positioning member comprises a second positioning member body, the second positioning member body is disposed on the second side surface, an end that is of the second positioning member body and that faces the first wall plate is a third end, an end that is of the second positioning member body and that faces away from the first wall plate is a fourth end, and a compressible capability of the second positioning member body gradually increases from the third end to the fourth end in a direction perpendicular to the second side surface.

17. The electronic device according to claim 16, wherein the bracket further comprises a third side surface, the third side surface is connected between the first surface and the second surface, and the third side surface is connected to an end that is of the first side surface and that is away from the second side surface;
- the camera body is further located on a side that the third side surface faces; and
- the electronic device further comprises:
- a third positioning member, located between the third side surface and the camera body, wherein the third positioning member comprises a third positioning member body, the third positioning member body is disposed on the third side surface, an end that is of the third positioning member body and that faces the first wall plate is a fifth end, an end that is of the third positioning member body and that faces away from the first wall plate is a sixth end, and a compressible capability of the third positioning member body gradually increases from the fifth end to the sixth end in a direction perpendicular to the third side surface.

18. The electronic device according to claim 1, wherein the bracket further comprises a fourth side surface, the fourth side surface is connected between the first surface and the second surface, and the fourth side surface is opposite to the first side surface;
- the camera body is further located on a side that the fourth side surface faces; and
- the electronic device further comprises:
- a fourth positioning member, located between the fourth side surface and the camera body, wherein the fourth positioning member comprises a fourth positioning member body, the fourth positioning member body is disposed on the fourth side surface, an end that is of the fourth positioning member body and that faces the first wall plate is a seventh end, an end that is of the fourth positioning member body and that faces away from the first wall plate is an eighth end, and a compressible capability of the fourth positioning member body gradually increases from the seventh end to the eighth end in a direction perpendicular to the fourth side surface.

\* \* \* \* \*